US009805369B2

(12) United States Patent
Thomas

(10) Patent No.: US 9,805,369 B2
(45) Date of Patent: Oct. 31, 2017

(54) PRIVATE PAYMENT AND PURCHASING SYSTEM

(76) Inventor: John K. Thomas, Saratoga, CA (US)

( * ) Notice: Subject to any disclaimer, the term of this patent is extended or adjusted under 35 U.S.C. 154(b) by 119 days.

(21) Appl. No.: 13/102,325

(22) Filed: May 6, 2011

(65) Prior Publication Data

US 2011/0276479 A1 Nov. 10, 2011

Related U.S. Application Data

(60) Provisional application No. 61/331,881, filed on May 6, 2010.

(51) Int. Cl.
| | |
|---|---|
| *G06Q 20/00* | (2012.01) |
| *G06Q 20/36* | (2012.01) |
| *G06Q 20/38* | (2012.01) |
| *G06Q 20/10* | (2012.01) |
| *G06Q 20/12* | (2012.01) |
| *G06Q 30/02* | (2012.01) |
| *G06Q 30/06* | (2012.01) |

(52) U.S. Cl.
CPC ......... *G06Q 20/383* (2013.01); *G06Q 20/102* (2013.01); *G06Q 20/12* (2013.01); *G06Q 30/02* (2013.01); *G06Q 30/06* (2013.01)

(58) Field of Classification Search
CPC .............................. G06Q 20/00; G06Q 20/36
USPC ......................................................... 705/67
See application file for complete search history.

(56) References Cited

U.S. PATENT DOCUMENTS

| | | | | |
|---|---|---|---|---|
| 7,387,250 | B2 * | 6/2008 | Muni ....................... | 235/462.01 |
| 7,827,101 | B2 * | 11/2010 | Mascavage, III .............. | 705/39 |
| 8,090,615 | B1 * | 1/2012 | Cunningham et al. .... | 705/14.27 |
| 2002/0152126 | A1 * | 10/2002 | Lieu et al. ....................... | 705/26 |
| 2004/0139008 | A1 * | 7/2004 | Mascavage, III ............... | 705/40 |
| 2005/0027543 | A1 * | 2/2005 | Labrou et al. ..................... | 705/1 |
| 2005/0125301 | A1 * | 6/2005 | Muni ............................... | 705/23 |
| 2006/0242019 | A1 * | 10/2006 | Walker et al. .................. | 705/14 |

(Continued)

FOREIGN PATENT DOCUMENTS

| | | | |
|---|---|---|---|
| EP | 1513120 | A2 * | 3/2005 |
| JP | 2008217277 | A * | 9/2008 |

OTHER PUBLICATIONS

"QR codes set to revolutionize shopping," Anonymous. The Province. Vancouver, B.C. Dec. 28, 2008: A.46. Printed via Proquest: 3 pages.*

(Continued)

*Primary Examiner* — Sara C Hamilton
(74) *Attorney, Agent, or Firm* — Sheridan Ross P.C.

(57) ABSTRACT

A system allows for conducting the financial and commercial (buying, selling, donating, gifting and paying) transactions that leverage communication devices to avoid the disclosure of a user's payment information. The payee (seller, seller's agent, receiver of funds, etc.) provides information or a token to the payer (buyer, buyer's agent, or any other provider of funds) who then directs funds to that token. In other words, rather than the payer providing information that is used by the payee to "pull" funds from the payer, the system allows a payee to provide information to which a payer "pushes" a payment. Since the payment is "pushed" by a customer, and often, but not always, using some type of a communication and/or computing device, the point-of-sale (POS) terminal has essentially been transferred from the merchant to the customer.

44 Claims, 14 Drawing Sheets

(56) References Cited

U.S. PATENT DOCUMENTS

| | | | | |
|---|---|---|---|---|
| 2006/0242020 | A1* | 10/2006 | Walker et al. | 705/14 |
| 2007/0271194 | A1* | 11/2007 | Walker et al. | 705/80 |
| 2008/0222048 | A1* | 9/2008 | Higgins et al. | 705/67 |
| 2008/0228642 | A1* | 9/2008 | Kim et al. | 705/40 |
| 2008/0243702 | A1* | 10/2008 | Hart et al. | 705/66 |
| 2008/0319913 | A1* | 12/2008 | Wiechers et al. | 705/67 |
| 2009/0084840 | A1* | 4/2009 | Williams et al. | 235/379 |
| 2009/0099961 | A1* | 4/2009 | Ogilvy | 705/39 |
| 2009/0283589 | A1* | 11/2009 | Moore et al. | 235/382 |
| 2009/0288012 | A1* | 11/2009 | Hertel et al. | 715/738 |
| 2010/0250290 | A1* | 9/2010 | Lefkowitz et al. | 705/5 |
| 2011/0137742 | A1* | 6/2011 | Parikh | 705/26.1 |

OTHER PUBLICATIONS

"Companies providing QR codes for camera-equipped phones," Pacific, R.C. (Jun. 25, 2004). Innovative New Packaging in Japan, 8 (6), 1-1. Printed via Proquest: 2 pages.*

"Analysis: QR codes get backing from major publishers," New Media Age. (Dec. 13, 2007): 10. Printed via Proquet: 1 page.*

* cited by examiner

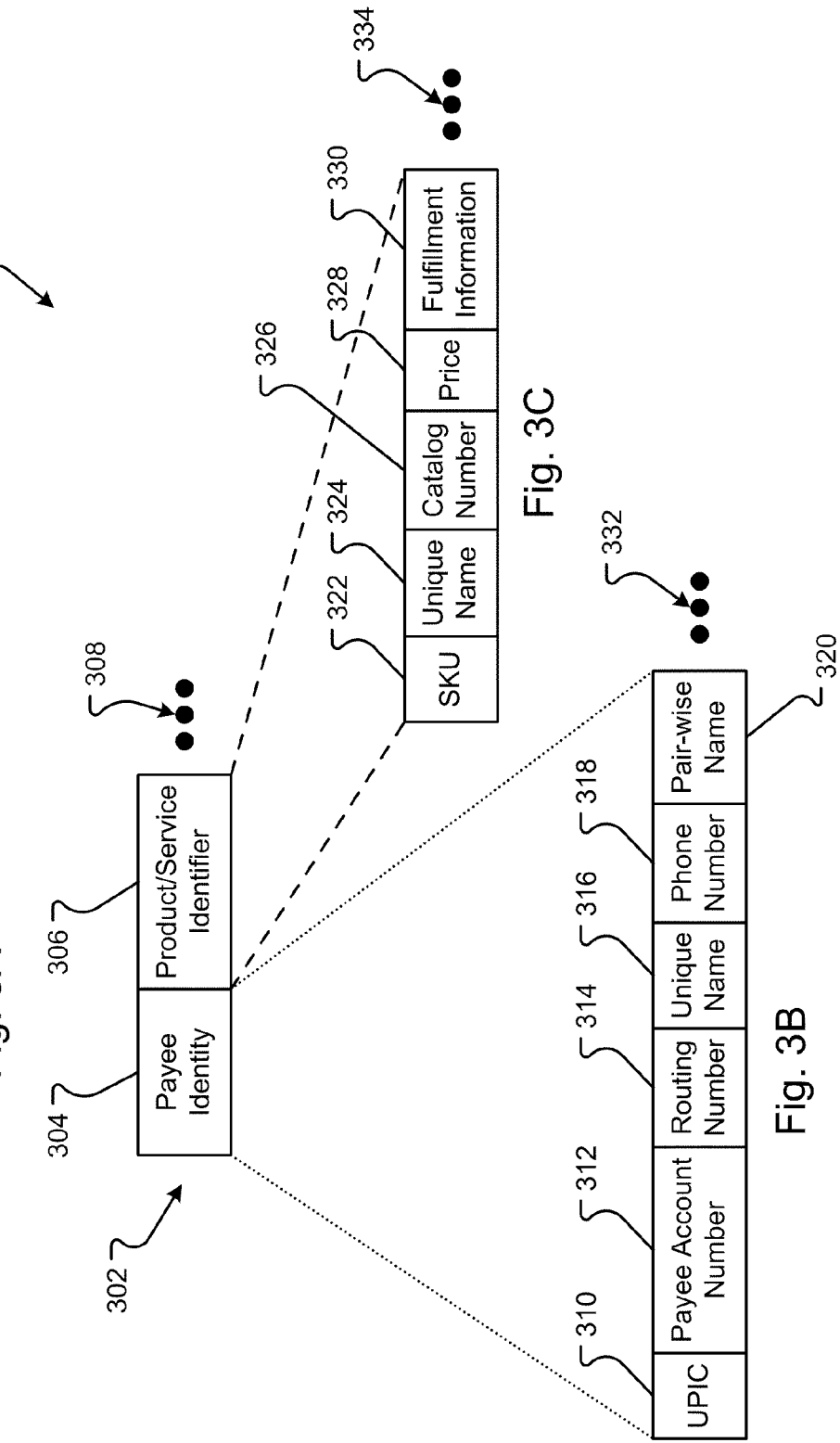

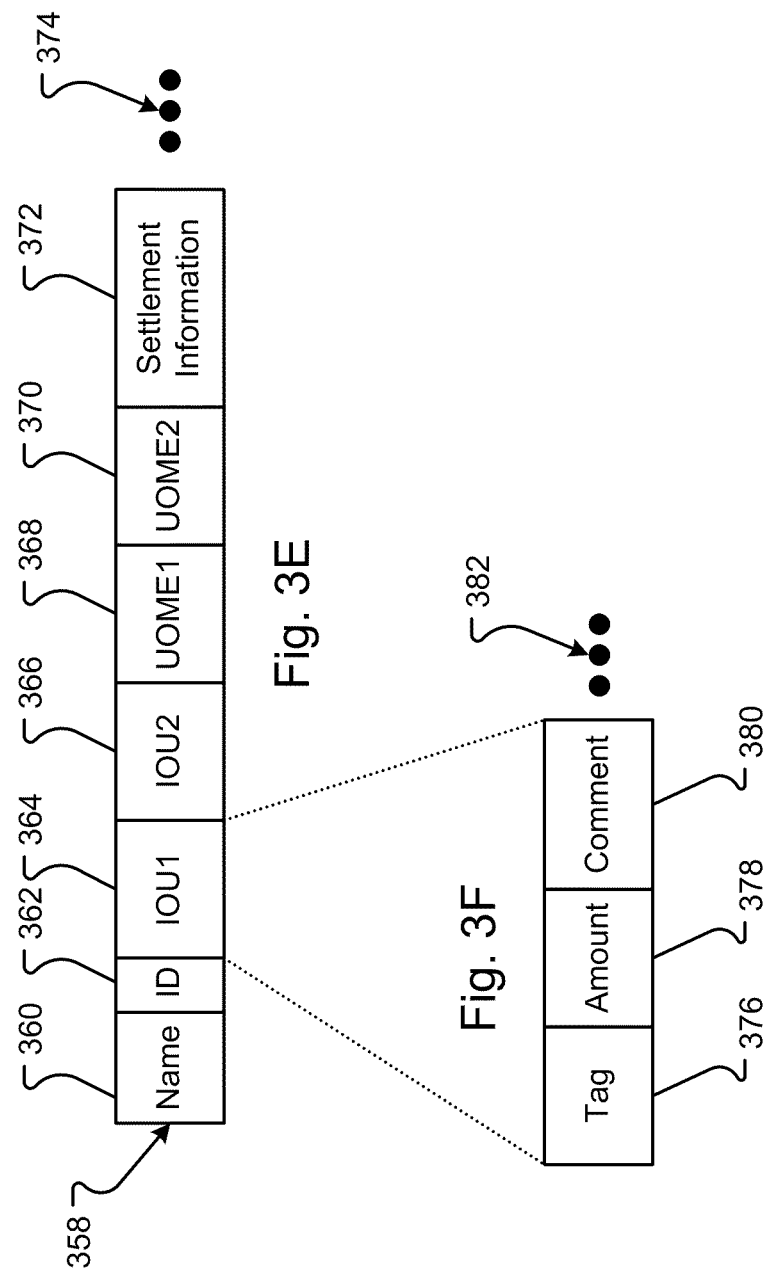

PRIVATE PAYMENT AND PURCHASING SYSTEM

This application claims priority to U.S. Provisional Patent Application 61/331,881, entitled "Private Payment and Purchasing System," filed May 6, 2010, which is incorporated herein by reference in its entirety for all that it teaches and for all purposes.

BACKGROUND

In traditional non-cash transactions, a buyer is required to provide to the seller some payment information with which the seller or payee (receiver of funds) "pulls" funds from the payer's account. Such an account may be held by a financial institution like a bank or credit union or it could be held by a card company and in some cases by third parties like Paypal.

For example, in a card-present transaction, the card is handed to a cashier who then electronically or manually accesses the card information (either from the magnetic strip or off the face of the card) and uses it to pull funds from the payer's account. In a card-not-present transaction, such as on a website or on a call with a sales associate of a merchant, the card information is provided to the seller or seller's agent and then this card information is used to pull funds from the payer's account. Often, in addition to payment information, additional information such as billing address, shipping address and phone numbers are also required to complete the transaction. The cards used in both card-present and card-not-present transactions, may be credit cards, debit cards (both PIN and signature) as well as gift cards (both open loop and closed loop).

In a check transaction, a check with the routing number, account number and funds amount is provided to a seller or seller's agent or payee and the information on the check is used to pull the funds. Several alternative payment schemes have emerged where the payer's information is kept hidden from the seller, seller's agent or receiver of funds (payee). In such payment schemes a trusted third party still acts as the escrow and holds the relevant information. This party may still "pull" the funds from a payer's bank account or credit card as in the case of PAYPAL or directly offer credit as in the case of BillMeLater. In these cases, nevertheless, the Point-Of-Sale (POS) resides with the merchant. Recently gift cards have emerged as a mechanism for transferring funds without disclosing payer's information. However, the gift card number and associated information itself is often adequate to access the funds stored in the card. The same is true for mobile devices with stored funds using technologies like Near Field Communications (NFC).

SUMMARY

It is with respect to the above issues and other problems that the embodiments presented herein were contemplated. Embodiments described in the present application provide systems and method for conducting a financial transaction without a payer providing account information to a payee. Rather, a payee provides the payer a "token." The token can identify the payee and a product or service associated with the transaction. The payer provides the token to a private payment system which pays the payee using information in the token. After receiving payment or an approval for payment, the payee can provide the product or service.

The embodiments of the methods and systems for conducting the financial and commercial (buying, selling, donating, gifting and paying) transactions leverage communication devices to avoid the disclosure of a user's payment information. In embodiments, the payee (seller, seller's agent, receiver of funds, etc.) provides information or a token to the payer (buyer, buyer's agent, or any other provider of funds) who then directs funds to that token. In other words, rather than the payer providing information that is used by the payee to "pull" funds, the embodiments allow a payee to provide information to which a payer "pushes" a payment.

An example of a point-of-sale (POS) terminal is the credit card terminal that accepts a swipe of the magnetic strip on the credit card or the number printed on the credit card. The POS terminal accepts account information that can be used by the merchant to pull funds. In the present embodiments, a user's cell phone or another device is used to accept information about the merchant, i.e., the customer receives a token. The token is used by the customer to push funds. Since the payment is "pushed" by a customer, and often, but not always, using some type of a communication and/or computing device, the POS terminal has essentially been transferred from the merchant to the customer.

Payee tokens can have different forms. The token can uniquely identify the payee and may also identify a product or service or any other reason for the payment. One example of a payee token (or information that may be included in the token) is a universal payment identification code (UPIC). A UPIC is a unique bank account identifier that has been established by financial institutions in order to allow merchants and other organizations to receive electronic payments without disclosing their account information. UPIC was developed by the Electronic Payments Network (EPN).

Another example of a token, albeit significantly less secure for the payee, is the payee's account number and routing number at a financial institution, for example, a bank or credit union account number and routing information. Another example might be a unique name or handle, such as, a mobile device number or a combination of a merchant identifier (name, unique number, etc.). Another example might include a handle or name that is pair-wise unique (i.e., the handle is unique between a pair of individuals—e.g., "mom," "dad," "Dave," or "JT").

A merchant can include the token in an advertisement, announcement, catalog entry, webpage, receipt, invoice, bill, or any other statement about a product or service offered. The token might consist of or be derived from a merchant identifier and a product identifier (stock keeping unit (SKU) number). A purchaser or buyer of that merchant's product or service may then "push" a payment to that token using a Private Payment System (PPS) described below. The merchant, upon receiving notification of a payment received or payment approval, can deliver the product or service to the buyer either directly or through an agent. The merchant advertisement or statement may be on TV, on a billboard, in a newspaper, on a radio broadcast, on an internet website, or sent to a mobile device.

The merchant code can be any tag that uniquely identifies a particular merchant or a store. For example, the following table lists some well known merchants and some possible merchant codes or tokens:

| Merchant name | Possible codes |
| --- | --- |
| Saks Fifth Avenue | SAKS |
| Neimann Marcus | NM or Neimarc |
| Starbucks | STRBKS |
| Ann Taylor | ANTLR |

In another example, a merchant could sign-up with PPS and can register a merchant code. A user who has signed up with PPS can use the merchant code and a product number (for example, a product number in a catalog) to facilitate a purchase of the product. To purchase the product, the customer communicates the merchant code and product number to PPS. The PPS confirms the product, its price, and fulfillment mechanism (i.e. where to send the product or service that was purchased—for example, send to user's email, home address, or work address). Then, the PPS confirms the cuctomer's choice of payment (debit account or credit account—setup by the user). The PPS authenticates the user and completes the transaction by sending a payment confirmation to the merchant along with a purchase order complete with shipping address and instructions. The user selected item is then delivered by the merchant to the user or the service or product is provided, for example, seats at a stadium or auditorium are reserved, a customer pick-ups the product, etc. Upon provided the product or service, the transaction is complete. In this transaction, the user's payment information was never transmitted to the merchant. The merchant never having taken possession of the buyer's payment information does not have to incur any liability surrounding its security.

The PPS executes the "push" payment and purchasing described above. The PPS can include a switch. A switch can be a component of the PPS that can interact with a user or merchant (a merchant may be an organization or another person) to direct communications and data. The switch functions as an engine to effect push payments. A user wishing to facilitate a payment or purchase communicates with the PPS through a communications gateway using communications protocols that include but are not limited to short message service (SMS), instant messaging (IM) (e.g., Yahoo! Messenger, AOL Instant Messenger, etc.), unstructured supplementary service data (USSD), e-mail, interactive voice response (IVR), etc. In the message to the PPS, the user communicates the payee's token to the switch. The switch, through a token sub-system interacts with the merchant and/or independent parties, involved in processing the merchant's payments, associated with that token. The independent parties may include contracted entities or other entities that process payments for the merchant) In particular, the token sub-system interacts with merchant's product data store, which may be off-site or local to the merchant, to determine the product being purchased by the user. The switch, after authenticating the user and establishing availability of funds, generates a order and/or payment. A payment and order processing sub-system of the PPS sends an payment approval and/or an order, possibly along with notification of payment or approval of the payment of funds to the merchant's bank or UPIC, to the merchant's order processing system to complete fulfillment. The order also includes fulfillment instruction including where the product or service is to be sent (physical address, email address, mobile device, etc.)

The payment and order processing sub-system can generate the payment transfer instructions and send the funds to the PPS funds sub-system or bank, which then transfers payments to the merchant or payee's bank or UPIC via automated clearing house (ACH) transmission or an electronic funds transfer (EFT). A copy of the purchase order and a confirmation of the payment (including tracking information obtained from the merchant) is sent to the switch, where the switch can store a copy and send it to the user.

The authentication of the user is carried out by the authentication sub-system. The authentication sub-system can use a multi-factor authentication. For example, the multiple factors may be: a) an authorized phone number (mobile phone, home phone, office phone, etc.); b) a personal identification number (PIN) or password; c) the activity, which can trigger additional or different checks, for example, a restricted fulfillment, i.e., the product or service is restricted to a limited set of addresses (physical or electronic) that can be under the control of the user, or a change of addresses. In other words, even if a) and b) were compromised the benefit of the payment is restricted to pre-set fulfillment addresses.

In another example of when addition authentication is sued, a user may use the PPS is used to transfer funds to another PPS user. If the user is trying to transfer funds to another user, then additional challenge questions can be posed by the authentication sub-system that must be answered by the user before the transaction can be completed. The authentication sub-system may also determine the authenticity of the transaction, based on other metrics, or may pose challenge questions.

The PPS may offer a user the ability to make either a debit payment or a credit payment. In case a debit payment is chosen, then a debit sub-system can verify the user's balance, sequester the requisite amount for the payment, authorize the payment and notify the PPS of the authorization. If the debit funds are inadequate, then the debit sub-system may notify the switch, which can then notify the user. The user may then choose to use credit through the credit sub-system or replenish the debit account.

The credit sub-system can verify a user's credit limit to determine whether the purchase amount can be supported. If the purchase amount can be supported, then the switch is notified and the transaction is completed. If the purchase cannot be supported, the user is notified or the credit limit is increased based on the user's credit worthiness. Credit worthiness may be determined by methods well known to those skilled in the art.

The fulfillment sub-system can control the delivery of product and services. The fulfillment system may store or contain the user's pre-determined methods that are to be used for delivery products and/or services. Thus, the data stored by the fulfillment system can include electronic and physical addresses where goods are to be shipped or that the user desires to use in-store pickup. When using in-store pickup, the fulfillment data may include security instructions that the person picking up the good will need to provide identification and proof of the sale, e.g., a receipt. The pre-determined addresses can be changed but only through additional electronic access, which is secured with additional passwords, pins, and other security measures.

The users of the PPS can setup or establish their profile and related information. This information may be stored and maintained in the user profile subsystem (UPS). The UPS may store a user's information, which can include one or more of, but is not limited to, name, address, electronic address, phone number, transaction phone number, date of birth, social security number, etc. A user can also setup a network of friends and family by importing contact information from an existing contact system (like MS Outlook™), Facebook, their handset, or other systems. The entry of the information may be automatic or manual. A user may attach a special name or tag with some (or all) of the contacts. For example, the user may use the tags "Dad," "Mom," "Uncle Dave," "Grandma Susan," etc. These special names, tags, or handles can be stored as tokens described earlier for facilitating payments and/or gifting between PPS users.

In addition, each user can setup funds transfer vehicles. Such vehicles can include one or more of, but are not limited to, bank account(s) (with account number, routing number, and/or other identifiers), re-loadable gift cards, merchant cards (e.g. Starbucks cards), payroll cards, debit cards, etc. The vehicles may provide the users with the ability to transfer funds into their PPS accounts from their bank accounts, gift cards etc. Further, the vehicles also afford the user the ability to transfer funds into another members account in the PPS. The transfer vehicles can also provide individuals in a user's network to transfer funds into the user's account(s) or cards. Finally, transfer vehicles may allow a user to setup one or more anonymous handles, which can be used for transactions with "strangers" to whom a user may not wish to divulge phone numbers, names, or payment information. Such a capability is useful when individuals are making purchases of goods and services advertised in newspapers, electronic boards (like Craigslist), and other media. The user may also establish a default currency in which transactions are to be made. For example, customers in the United States will have a default currency in U.S. dollars.

In addition to transactions with merchants, the PPS can also be used to facilitate transactions between individuals. Individuals might be members of a professional, family, or social network, and the transactions envisioned might include, but are not limited to, payments, gifting, and establishing tabs (funds owed between individuals).

The term "network" as used herein refers to a group of individuals, a social network, and/or a system used by one or more users to communicate. The network can consist of one or more servers, communication endpoints, computer systems, etc. that allow communications, whether voice or data, between two or more users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures:

FIGS. 3A through 3C are block diagrams of embodiments of data structures operable to store token information;

FIGS. 3E and 3F are block diagrams of embodiments of data structures operable to store tab information;

Figure 1:
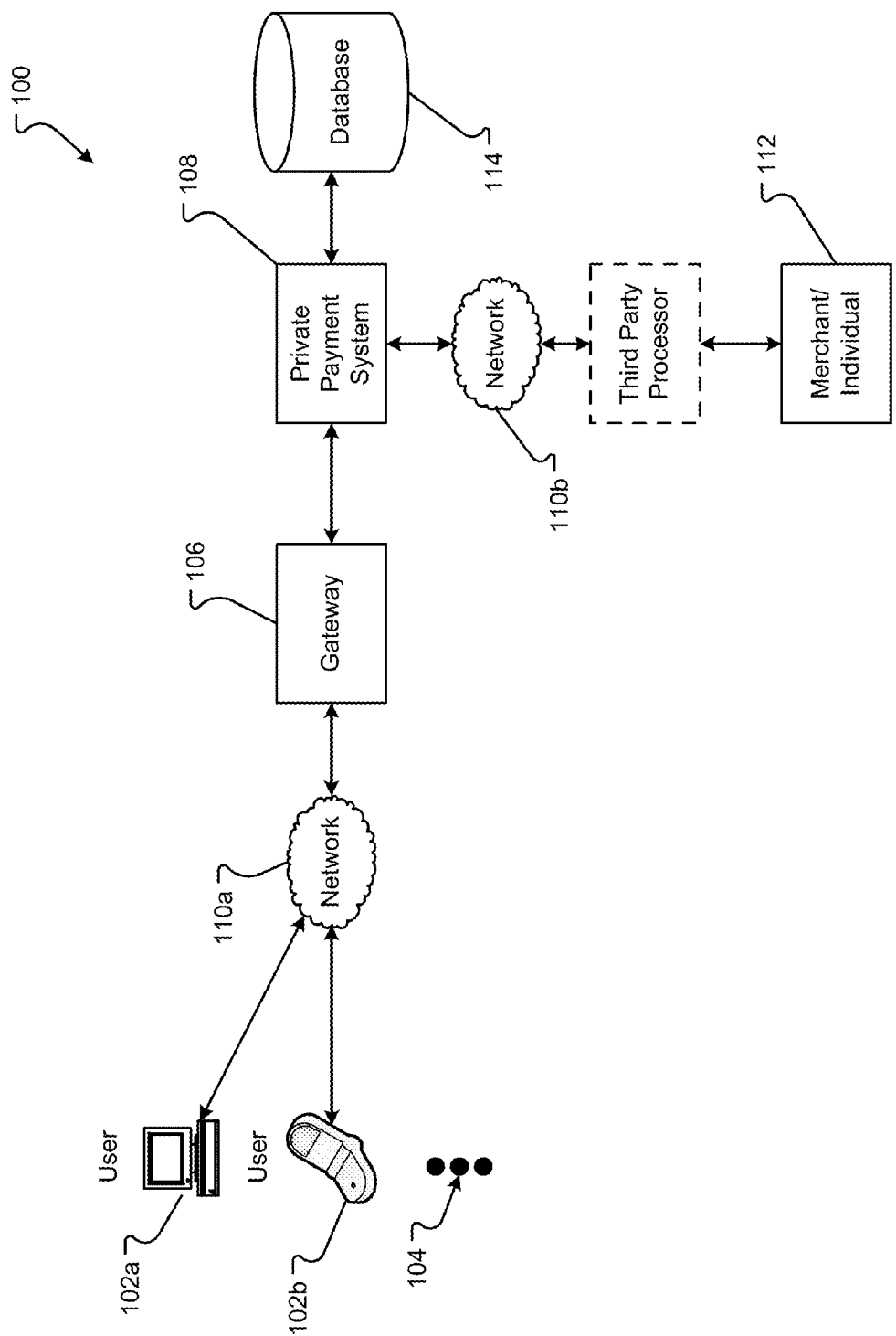
FIG. 1 is a block diagram of an embodiment of a system for conducting a push payment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

A system 100 can affect payments to and/or from users and/or merchants to purchase services and goods. The system 100 can include one or more components, which may be hardware and/or software that can be included in one or more computer systems, as described with FIGS. 6 and 7. The components may include one or more of, but is not limited to, one or more users 102, one or more networks 110, a private payment system 108, one or more merchants 112, at least one gateway 106, and/or one or more databases 114. Each of these components will be described hereinafter.

A user 102 can be any computer system or device used by a person or entity purchasing services or goods. Thus, the user may be represented by a laptop or desktop computer 102a, a user mobile device 102b, or one or more other types of user devices. There may be more or fewer users and/or user devices than those shown in FIG. 1, as represented by ellipses 104. A user can be any consumer, whether a person or organization, that purchases services or goods. The user computer systems can communicate with a network 110 to send or receive data or other communications to/from a gateway 106.

A network 110 can be any network used to communicate information between two or more computer systems. In embodiments, the network 110 may also represent phone systems or other means of communicating information from a user to a private payment system 108. Thus, the network 110 can represent systems or networks for completing phone orders or other types of communication systems. A network 110 can communicate in any protocol or format. The network 110 can be an intranet, the Internet, the World Wide Web, etc. In other embodiments, the network 110 may be a public switched telephone network (PSTN) or other type of phone system.

A gateway 106 can be a system that manages communications for a private payment system 108. The gateway 106 can be any set of hardware and/or software operable to facilitate communications. The gateway 106 may be operable to form communications into one or more user-specific protocols to be sent to the user 102. Thus, if the user is operating a mobile device, the gateway 106 may be operable to put the private payment system communications into a format that may be received by the mobile device 102b.

A merchant or merchant system 112 can be any type of hardware and/or software that is operable to process orders for or requests for information about goods or services and/or to receive payment for goods or services. It should be noted that a merchant, as used herein, can include organizations, for example, big-box retails (e.g., Best Buy, Sears, etc.), online retailers e.g., (Amazon, Zappos, etc.), other retailers, distributors, manufacturers, etc. and can include individuals. If the merchant is an individual, the transactions with the PPS 108 are essentially person-to-person. The merchant system 112 can include ordering systems, financial institution systems, and/or other systems that may receive payment and/or process orders to be sent to a user 102.

A merchant 112 can create a token for the merchant's products or services using the PPS 108. The token may then be used to facilitate the buying of the merchant's products or services. The token is the "property" of the PPS 108, but the merchant 112 effectively "rents" the token for their use. The token, if acquired and employed, by a consumer, provides a gateway into the merchant's product(s) or service(s). The token contains the merchant's purchasing information.

It should be noted that merchant 112 can be broadly interpreted to mean individuals and not just organizations. Therefore, individuals utilizing Facebook, YouTube, or other social networking sites can employ a transactional capability by acquiring a token from the PPS 108 and using the token to communicate the purchasing details for a product or service. The visual appearance of the token may include visual cues as to the identity of the merchant, e.g., a company logo, a brand name, other trademark, and the token can indicate that the PPS 108 is providing the transactional capability.

Figure 6:
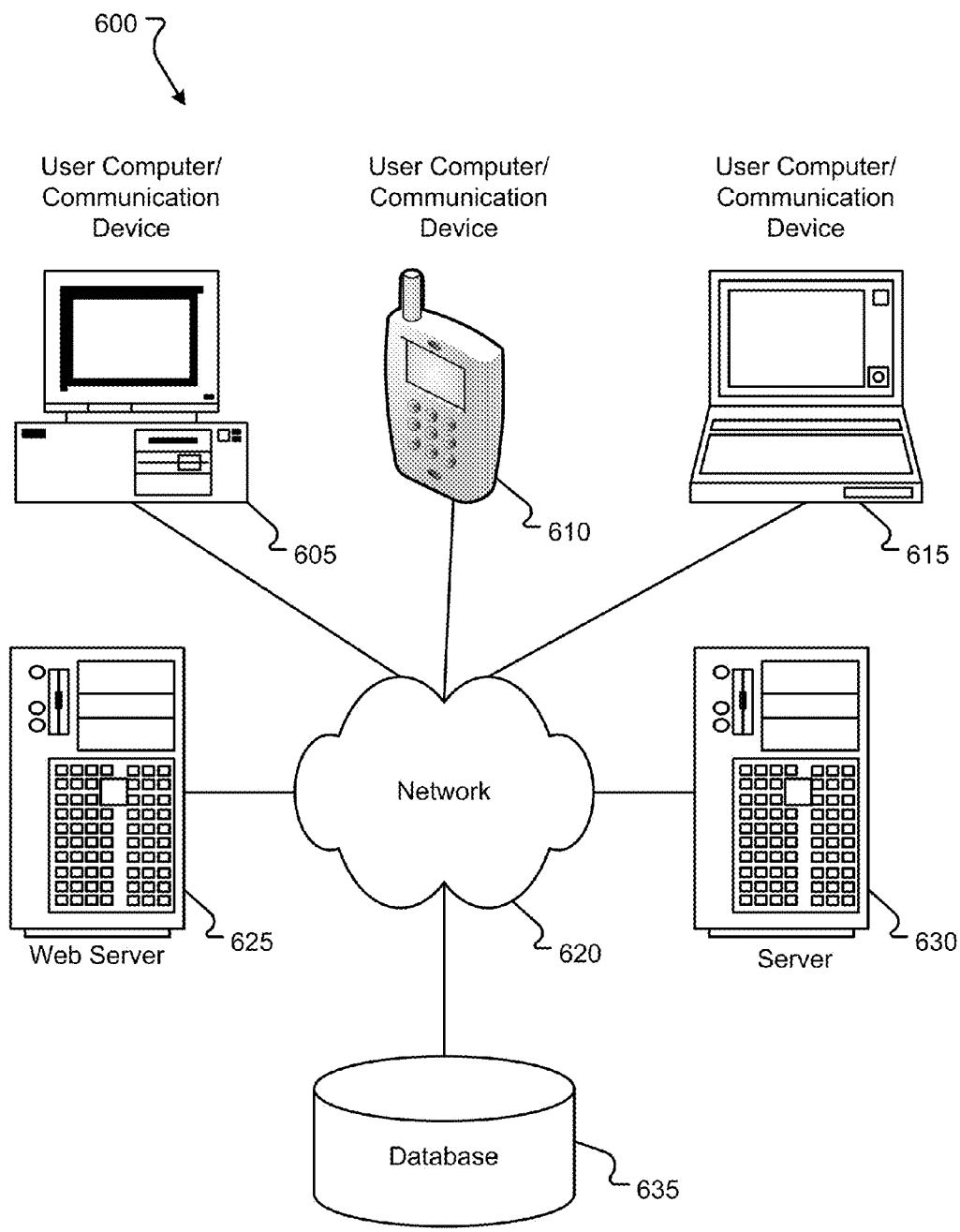
FIG. 6 is a block diagram of an embodiment of a computing environment operable to execute the embodiments described herein.
Figure 7:
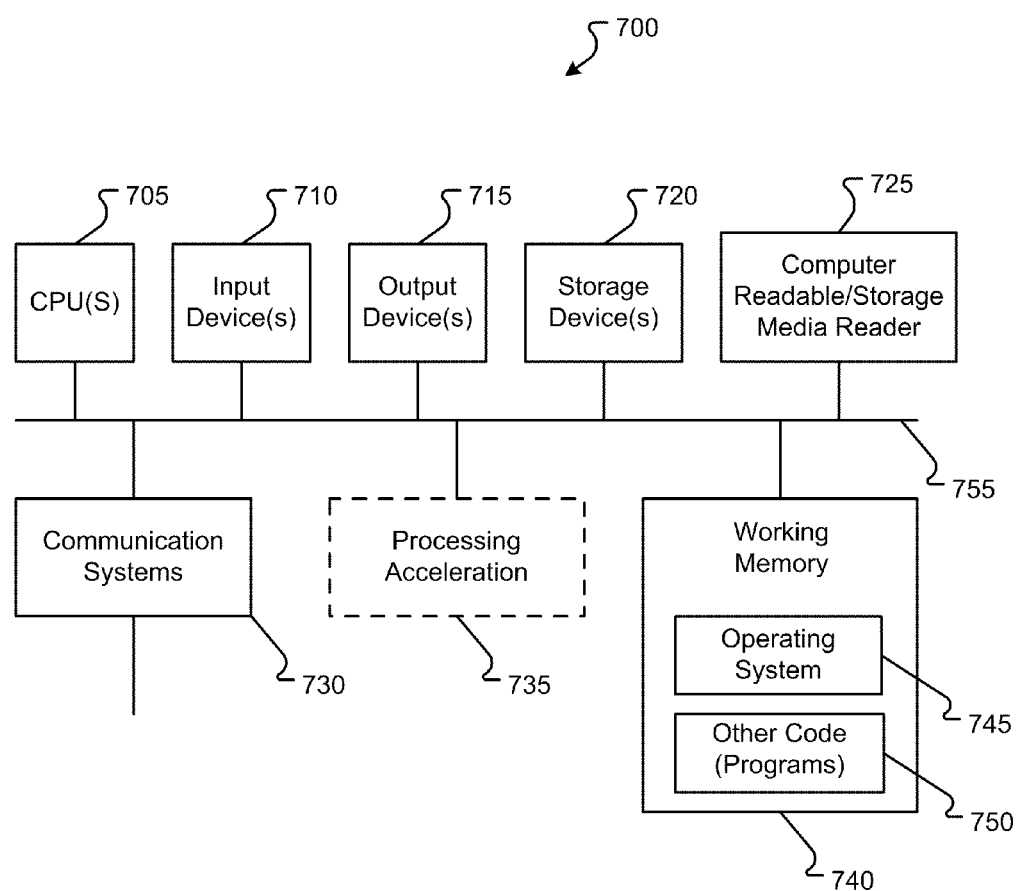
FIG. 7 is a block diagram of an embodiment of a computer or computing system environment operable to execute as the one or more devices described herein.

The database 114 can be any database or storage system as described in conjunction with FIGS. 6 and 7. The database 114 can store information as described in conjunction with FIGS. 3A through 3F. The database 114 may store this information in one of several different formats or by different methods, for example, a relational database, a flat file database, an object oriented database, etc. The database 114 allows the private payment system 108 to both store and retrieve data for processing payments to and from users, and/or between users and merchants. In embodiments, the database 114 may be a part of the private payment system 108 or maybe a separate storage system that is in communication with the private payment system 108 but does not store information locally.

The private payment system 108 can be any hardware and/or software operable to process payments to from users 102 and/or from users 102 to merchants 112. An embodiment of the private payment system 108 is described in conjunction with FIG. 2. The private payment system 108 can receive tokens from a user 102 that allows the private payment system 108 to direct payment to a merchant 112. Further, the private payment system 108 can process orders for the user 102 from the merchant 112. Thus, the private payment system 108 can facilitate the purchasing of services and goods between users 102 and merchants 112, or between two or more users 102, without providing user financial data to the payee, whether another user 102 or a merchant 112.

Figure 2:
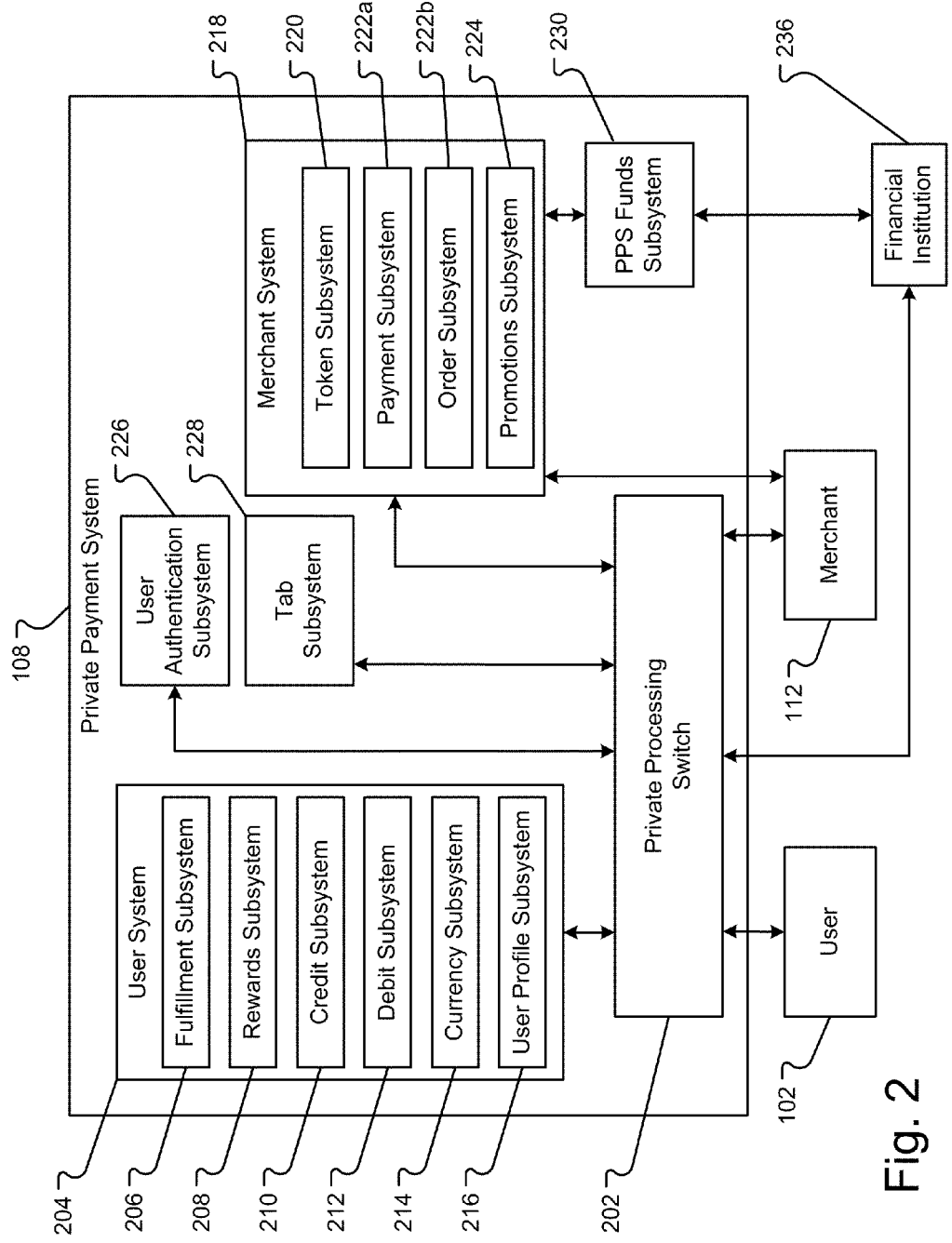
FIG. 2 is a block diagram of an embodiment of a PPS operable to conduct a push payment.

An embodiment of a private payment system (PPS) 108 is described in conjunction with FIG. 2. The private payment system 108 can be a computer system as described in conjunction with FIGS. 6 and 7. The private payment system 108 may include hardware and/or software operable to conduct the functions described herein. In embodiments, the private payment system 108 can include one or more components, modules, or systems which may be hardware and/or software that execute different functions. In embodiments, the private payment system 108 can include one or more of, but is not limited to, a user system 204, a private processing switch 202, a merchant system 218, a PPS funds subsystem 230, a user authentication subsystem 226, and/or a tab subsystem 228.

The private processing switch 202, in embodiments, can be hardware and/or software. However, the private processing switch 202 will be explained as being a software module hereinafter, but the embodiments shall not be so limited. The private processing switch 202 is able to receive communications from the user 102, the merchant 112, the financial institution(s) 236, or other external entities to the private payment system 108. The private processing switch 202 can reroute the communication(s) to one or more subsystems within the private payment system 108. As such, the private processing switch 202 functions as an engine to provide functionality to the private payment system 108 and complete transactions conducted by the private payment system 108. In embodiments, the private processing switch 202 receives communications from a user 102 and sends the user communications to a user subsystem 204.

The user subsystem 204 is operable to conduct one or more functions in response to user interactions. Thus, the user subsystem 204 can include one or more subsystems, which can complete the one or more functions for the user. The one or more subsystems can include one of more of, but are not limited to, a fulfillment subsystem 206, a reward subsystem 208, a credit subsystem 210, a debit subsystem 212, and/or a currency subsystem 214. Each of these one or more subsystems will be described in more detail hereinafter.

A fulfillment subsystem 206 may be operable to complete the payment of tabs or other orders or financial transactions for the user. As such, the fulfillment subsystem 206 can interact with one or more other subsystems to receive money that may then be forwarded to the private processing switch 202 to send to a merchant system 112. The fulfillment subsystem 206 can take in one or more tokens, determine a price or receive a price for a service or good, and then arrange for the payment of the service or good. The fulfillment subsystem 206, in further embodiments, can also control the delivery of a product or service. Thus, the fulfillment subsystem 206 can receive information from a user 102 about how a product or service should be delivered to the user. In embodiments, the user 102 can determine, for all products or services ordered through the private payment system 108, how delivery should be completed and pre-set the delivery methods. For example, the delivery address for a product may be provided or the default device to download software may be provided, or other information to complete the fulfillment of the order may be provided and stored. Thus, the fulfillment subsystem 206 can save any predetermined methods or data, such as, specific electronic or physical addresses, to be used in the delivery of a product or service. This information may be stored in the database 114. In embodiments, the data can only be changed through specific passwords or additional security measures, such that, this information can only be controlled by the user and is maintained securely within the private payment system 108.

A rewards subsystem 208 can maintain rewards data for the user 102. A rewards subsystem 208 can function to offer purchase rewards similar to a customer appreciation or loyalty program, as offered through one or more retailers. Thus, the rewards subsystem 208 provides the same type of user benefit as those systems while the user employs the private payment system 108. In other embodiments, the rewards system 208 can store the rewards offered from the merchants that are provided to the private payment system 108 after the purchase of a good or service. Thus, the reward subsystem 208 can provide a clearing house for rewards to the user while giving the user a single interface to review rewards from two or more merchants.

The credit subsystem 210 can be operable to pay for services or goods requested by the user 102 using a credit payment. In an embodiment, the credit payment may be from a user's credit card or other account provided to the credit subsystem 210 by the user 102. In other embodiments, the credit subsystem 210 functions as a credit account. Thus, the credit subsystem 210 can maintain a credit account for the user 102 with a credit limit. The credit subsystem 210 can verify whether the purchase price is lower than the user's credit limit. If the price is below the user's credit limit, the credit subsystem 210 can approve the purchase and inform the private processing switch 202. The private processing switch 202 can then direct other subsystems to complete the order. If the user's credit limit is not above the purchase price, the credit subsystem 210 can either disapprove of the purchase (a disapproval message is then sent to the private processing switch 202) or can increase or change the user's credit limit to complete the order. Thus, the credit subsystem 210 provides a method for payment of goods or services through the private payment system 108 that allows the user to use credit rather than debit or other forms of payment.

In other embodiments, the user may pay for the good or service using a debit subsystem 212. The debit subsystem 212 can maintain an account holding a payment or balance for the user 102. The debit subsystem 212 can verify the purchase price of any good or service against the user's balance. If the purchase prices is less than the user's balance, the debit subsystem 212 can sequester the purchase price amount and inform the private processing switch 202 that the funds are available to purchase the good or service. The authorization may be sent to the private processing switch 202, such that, the private processing switch 202 can direct other subsystems to complete the transaction. However, if the debit account has inadequate funds, the debit subsystem 212 can notify the private processing switch 202, which may then notify the user 102 that there are inadequate funds to use the debit subsystem 212. The user 102 may then direct funds to the private processing switch 202 to replenish the debit account stored within the debit subsystem 212. In other embodiments, the user 102 may choose a different payment system, such as, the credit subsystem 210.

The currency subsystem 214 affords the user 102 the ability to purchase goods from foreign vendors or to use different types of currency in purchasing goods or services. In embodiments, the currency subsystem 214 can convert the currency being used by the user into some other form of currency. Thus, the currency subsystem 214 can maintain current exchange rates or be able to retrieve current exchange rates for different types of currency. The currency subsystem 214 can receive a purchase amount in a first currency and convert the purchase amount to a different currency to be used with the other subsystems in the user system 204. In embodiments, the private processing switch 202 may direct any order through the currency subsystem 214 before sending that order on to the credit subsystem 210 or debit subsystem 212. In other embodiments, the credit subsystem 210 or debit subsystem 212 may contact the currency subsystem 214 when a conversion is necessary. Further, the PPS 108 may also use a new and different currency. Thus, exchanges within the PPS 108 are agnostic and all currencies entering the PPS 108 are converted before transactions are completed.

A user profile subsystem 216 may be operable to create a profile of the user. The user profile subsystem 216 can retrieve or receive information about the user. This information may include the users name, one or more identifiers (such as, a social security number), phone numbers, electronic addresses, or other information that is associated with the user. This user information may be stored in the database 114 and used either in payment or in order fulfillment by the user system 204 or one or more other systems in the private payment system 108.

The private processing switch 202 may also communicate with the merchant system 218 to conduct actions with the merchant 112. The merchant system 218 is operable to communicate with a private payment system fund subsystem 230 which may communicate with one or more financial institutions 236. Further, the merchant system 218 communicates with one or more merchants 112. The merchant subsystem 218 is operable to conduct actions that allow the merchant 112 to provide goods or services to a user 102 using the private payment system 108. A merchant system 218 can include one or more subsystems, which can include one or more of, but are not limited to, a token subsystem 220, a payment order subsystem 222, and/or a promotion subsystem 224. Each of these different subsystems will be explained in turn hereinafter.

The token subsystem 220 is operable to receive a token from the private processing switch 202. The token subsystem 220 is operable to communicate with the merchant 112 associated with the tag(s) or information in the token. Thus, the token subsystem 220 is operable to retrieve information from the database 114 associated with the token. From this information, the token subsystem 220 can identify the merchant 112 to which the token is associated. The token subsystem 220 may then communicate with the merchant 112 to determine information about the product also identified in the token. Thus, the token subsystem 220 can communicate with a product data store associated with the merchant 112 that may include one or more SKU numbers or other data identifying the product or service within the token. The token subsystem 220 may then receive information, such as the price of the product or service, to then affect payment for the good or service. The token subsystem 220 can communicate the information received from the merchant 112 to the private processing switch 202 to then use in processing the order with user system 204. In embodiments, the product data store associated with the merchant may be stored by a third party or off-site from the merchant 112. Regardless, the token subsystem 220 can communicate with a data source either local with the merchant or operated by a third party to retrieve information about the product or service associated with the token received at private processing switch 202.

Payment information received from the private processing switch 202, as compiled by the user system 204, may be sent to a payment order subsystem 222. The payment order subsystem 222 can push the payment to a PPS fund subsystem 203. The payment information may be formatted into a protocol or data packet, as required by the financial institution 236. For example, the PPS fund subsystem 230 can take the payment information from the private processing switch 202 and create an ACH transfer for the merchant 112. Thus, the PPS fund system 230 can push funds from the user to the merchant's financial institution 236 without the merchant ever receiving account information from the user. The methods for payment by the PPS funds subsystem 203 can include sending or transferring money to the merchant's bank or UPIC using ACH, EFT or other types of systems used for electronic or other payments. The payment order system 222 can receive a confirmation of the financial payment from the PPS fund system 230 or directly from the financial institution 236. This payment information may be forwarded to the private processing switch 202 to send to the user 102.

Upon receiving confirmation of payment for the good or service, the payment order system 222 can communicate with the merchant 112 to complete the order. In embodiments, the payment order system 222 can create a purchase order that is sent to the merchant 112. The payment order subsystem 222 can also wait and confirm delivery of the good or service with the user 102 through the private processing switch 202. Thus, the payment order subsystem 222 can maintain open orders until confirmation of delivery of the service or good is received from the user 102. In other embodiments, the payment order system 222 may also send the confirmation of payment to the merchant 112 as part of the completion of the order. Thus, the merchant 112 may be paid before having to send goods or services and receive confirmation of the payment. Thus, the merchant 112 need not receive account information from the user 102 as the merchant 112 was paid before having to deliver the services or goods to the user 102. The purchase order sent by the payment order subsystem 222 can contain various information including, but not limited to, the address to deliver service or goods, the electronic address to deliver a service or good, the fulfillment procedures as contained within the fulfillment subsystem 206, or other information needed by the merchant 112 to complete the order.

A promotion subsystem 224 can store or inquire about promotions from the merchant 112. In embodiments, the promotion subsystem 224 can maintain a list of sales data or other information that may be used in the processing of the order with the merchant 112. In other embodiments, the promotion subsystem 224 can receive any benefits for the user regarding the order placed by the user 102. These benefits may include points, airline miles, cash back, or other rewards that may then be transferred to the user's specific rewards section in the rewards subsystem 208. In still other embodiments, the merchant 112 may reward a customer using the PPS 108 currency described above. Thus, the customer gets "cash back" but in a currency used with the PPS 108, which may motivate further purchasing with the PPS 108.

A user authentication subsystem 226 can authenticate a user 102 when conducting transactions with the user 102. The user authentication subsystem 226 can verify security data such as, usernames, passwords, personal identification number(s) (PIN), or other such data that may be stored in the user profile generated by the user profile subsystem 216 and stored in the database 114. The authentication can be through any known method or security protocol known in the art. The user authentication subsystem 226 may also have one or more different types of authentication to use with each user 102 based on the actions requested by the user 102. For example, processing of a token may take a first level of authentication, but a second level of authentication may be used when the user 102 wants to change account information or access other more highly protected information stored within the database 114. Thus, the user authentication subsystem 226 protects the user's data from unauthorized use.

A tab subsystem 228 is operable to store, retrieve, reconcile, or otherwise act on one or more tabs stored within the private payment system 108. A tab, as the name indicates, can be an IOU or other type of information that represents a debt owed from a first user 102 to a second user, or to a merchant 112. The tabs may be created by the user 102 or by someone that the user 102 owes money. A description of the tabs is provided in conjunction with FIGS. 3E and 3F. The tabs may be stored in the database 114 by the tab subsystem 228.

An example of a token 302 for conducting push payments is shown in FIGS. 3A through 3C. The token 302 shown in FIG. 3A through 3C may include one or more data structures. For example, the token 302 can include a payee identity data structure 304 and a product/service data structure 306 shown separately in FIGS. 3B and 3C respectively. The data structures 302 and 306 may include one or more portions that store information. Each portion may store one or more items of information. The token 302 can include more or fewer fields than that shown in FIG. 3A, as represented by ellipses 308. Several tokens 302 may be stored or communicated by the private payment system 108. The one or more tokens 302 may be stored in the database 114. Embodiments of information that may comprise the payee identity 304 are shown in FIG. 3B.

The payee identity 304 can include one or more of, but is not limited to, a UPIC 310, a payment account number 312, a routing number 314, unique name 316, a phone number 318, and/or payer-wise name 320. The payee identity 304 can include more or fewer fields than those shown in FIG. 3B, as represented by ellipses 332. The UPIC 310, or universal payment identification code, can be the UPIC identifier for the merchant 112. This UPIC number may be stored as part of the token by the merchant 112.

In other embodiments, the payee identity 304 can include the payee account number for the merchants' financial institution account 236. Further, the payee account number 312 can be combined with the routing number 314 for the financial institution 236. The payee account number 312 and routing number 314 provide enough information to complete payment for the merchant 112. A unique name 316 can be a name created by the private payment system 108 or the merchant 112 that uniquely identifies the merchant 112 from other merchants. This unique name 316 can be a globally unique identifier (GUID), an alpha numeric number, a specialized name or abbreviation, or other type of identifier that uniquely identifies the merchant 112. In other embodiments, the payee identity 304 can be the phone number 318 for the merchant 112. The phone number 318 can be used by the private payment system 108 to access other information from the database 114 to effect payment and ordering of goods or services with the token 302.

The payee identity 304 can also include a merchant-created pair-wise name 320. The pair-wise name 320 can be an association that uniquely identifies the merchant 112. For example, the pair-wise name 320 can be a name of a type of business the merchant does that can that would uniquely identify the merchant 112. For example, if the merchant 112 is a book store located in a certain area code, the pair-wise name 320 could be an area code with the bookstore name, e.g., Borders 303. Thus, this pair-wise name 320 would identify that bookstore among all other bookstores in that area code. In other embodiments, the user 102 may create the pair-wise name 320 and store that as part of the token in the database 114. Thus, the information shown in the payee identity 304 can be information stored in the database 114 and information communicated with the token 302. If one or more of the fields in the payee identity 304 is received, other information may be retrieved from the database 114 that may be associated with that token 302. The user 112 can identify people using the pair-wise name 320, while some of the other information may be received from a merchant 112 in a token 302 provided by the merchant 112. For example, the pair-wised name 320 can be a designation by the user, such as, Aunt Jane. The pair-wise nature of the name is that this user's Aunt Jane can be identified by the associated between the user and the name of his aunt.

One or more fields that may be included in the product/service information 306 are shown in FIG. 3C. FIG. 3C may include more or fewer fields than those shown, as represented by ellipses 334. In embodiments, the product/service information 306 may include one or more of, but is not limited to, a stock keeping unit (SKU) number 322, a unique name of the product or service 324, a catalog number 326, price information 328, and/or fulfillment information 330. The information shown in FIG. 3C may be stored in database 114 or provided within the token 302 used by the merchant 112 for a user 102. Thus, if one or more of the fields are identified within the token 302, then other information may be retrieved from the database 114, although that information may be shown as part of the product or service portion 306 of the token 302.

A SKU 322 may be a unique identifier for the product or service within a database of goods or services stored with the merchant 112. The SKU 322 can be a bar code or other visual information or may be a unique number or alpha numeric identifier for the good or service. This SKU information may be provided to the merchant 112 to identify the product or service associated with the token 302. A unique name 324 may be a name used by the merchant 112, in identifying the good or service in a catalog for good or services provided by the merchant 112. A catalog number 326 may be a number within a particular catalog used by the merchant 112. Thus, the catalog number 326 can include the identifier from which catalog the information comes from and also the product or service number provided within the catalog.

A price 328 may be included with the token or may be retrieved either from the database 114 or from the merchant 112. The price 328 can be a currency or a numeric value for the good or service. Currency may also be listed with the price 328 to provide the currency subsystem 214 with information about what currency should be used for payment of the good or service. Fulfillment information 330 may include information provided by the merchant 112 to be used with the information stored by the fulfillment subsystem 206 to fulfill the order associated with the token 302. This fulfillment information 330 can include payment information, address information, or other information useful for the private payment system 108 to complete the order.

Figure 3D:
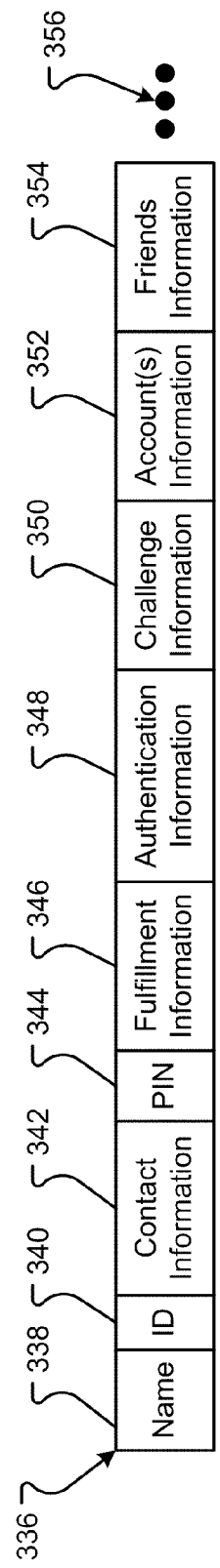
FIG. 3D is a block diagram of an embodiment of a data structure operable to store user profile information.

An embodiment of a user profile 336 is shown in FIG. 3D. The user profile 336 may be created from information received by the user or from information obtained by the PPS 108. The user profile 336 may be stored in the database 114. The user profile 336 may include one or more of, but is not limited to, a name 338, an ID 340, contact information 342, PIN 344, fulfillment information 346, authentication information 348, challenge information 350, account information 352 and/or friend's information 354. In embodiments, the user profile 336 may include more or fewer fields then that shown in FIG. 3D, as represented by ellipses 356. Each of these different types of information will be described herein after.

A name 338 can include the actual name, username, or some type of identifier (ID) of the user 102 of the private payment system 108. For example, the name 338 may be a first name and last name. In other embodiments, the name 338 can include the username, employed by the user, to log into the private payment system 108. An ID 340 can include an ID unique to the user that may be used in electronic communications or may be used by the user to mask their name. The ID 340 can include a social security number, a global unique identifier (GUID), or other ID, either automatically generated by the private payment system 108 or created manually by the user.

Contact information 342 can include the address, phone number, e-mail address, or other information for contacting the user. This contact information 342 may be entered by the user when creating a profile 336 with the private payment system 108. In other embodiments, the contact information 342 may be procured automatically by the private payment system 108 in interactions with the user 102. For example, the contact information 342 can include an e-mail address used to send information to the private payment system 108, an electronic address used to communicate with the private payment system 108, or other types of information that are automatically created and provided to the private payment system 108.

A personal identification number (PIN) 344 can be a user generated or automatically generated number used by the user 102 for authentication purposes or other security measures. For example, when the user 102 logs into the private payment system 108, with the user authentication subsystem 226, the user 102 may provide the name 338 and the PIN 344 to access the information stored in the user profile or to conduct transactions with the token.

Fulfillment information 346 may be the information used by the fulfillment subsystem 206 to determine how to fulfill a transaction with the user 102. The fulfillment information 346 may be generated or pre-set by the user 102 and stored within the database 114 to be used later by the payment order subsystem 222 in conducting transactions. The fulfillment information 346 can include what addresses to use for shipping addresses or which electronic addresses to use for sending electronic media, can include how to make payments to a merchant or other user, or can include other information used to conduct the transactions described herein.

Authentication information 348 may be the one or more items of information used by the user authentication subsystem 226 to determine the identity of and authenticate the user 102. This authentication information 348 can include one or more of, but is not limited to, a password, a security question, or other information that may be supplement information already included in other sections of the user profile 336. For example, that authentication information 328 can include a different username for the user 102, which is not included in the name field 338. The authentication information 348 may be encrypted and stored within the user profile and accessed by the user authentication subsystem 226 to verify the identity of the user 102.

The challenge information 350 can include one or more sets of information that can be used by the user authentication subsystem 226 for enhanced security measures. The challenge information 350 can include other information or security questions used by the user authentication system 226 to insure the user identity before allowing certain tasks. For example, if the user wishes to change the user profile 336, the fulfillment subsystem information 346, the credit subsystem and debit subsystem information, the challenge information 350 may be accessed to determine or insure the user's identity.

Account information 352 can include the one or more credit or debit accounts used by the credit subsystem 210 or the debit subsystem 212 for payment. The account information 352 can include account numbers and routing information. In other embodiments, the account information 352 can include credit card numbers, debit card numbers, or other types of payment information that may be used by the private payment system 108 to obtain funds to push to a merchant 218 or to another user.

Friends information 354 can include information for people associated with the user 102. This friends information 354 may include one or more of, but is not limited to, friend names, friend addresses, and/or friend account information. In other embodiments, other information is also included to identify the friends. Friends information 354 can be used to create IOUs in the tab subsystem 228. The tabs are explained in conjunction with FIGS. 3E and 3F and FIGS. 5A through 5C.

An embodiment of a tab 358 as used with the tab subsystem 228 is shown in FIGS. 3E and 3F. The tab 358 can include one or more items of information, but is not limited to, a name 360, an ID 362, an IOU 364/366, a you owe me (UOME) 368/370, and/or settlement information 372. The tab 358 can have more or fewer fields than those shown in FIG. 3E or 3F, as represented by ellipses 374 and 382. The tab information creates IOUs between users 102. Thus, the IOU 364/366 can include information about a person either owing money to another person or the person that is owed money.

The name field 360 includes the name of the user 120 that created the tab 358. In embodiments, the name 360 can be the person who owes money. The name 360 can be the same or similar to the name 338, as described in conjunction with FIG. 3D. As such, the name 360 can identify the user amongst all other users using the private payment system 108. The ID 362 can include or be similar to the ID 340, as described in conjunction with FIG. 3D. The ID 362, therefore, also may uniquely identify the person or user 102 that has created the tab 358 in the tab subsystem 228.

Each tab 358 may include one or more IOUs 364/366 and/or one or more UOMEs 368/370. An IOU 364/366 is a debt owed by the person identified by the name 360 and ID 362. An IOU 364/366 recognizes that that person owes money to another user. An embodiment of an IOU 364/366 is shown in conjunction with FIG. 3F. Here, an IOU 364/366 can include one or more of, but is not limited to, a tag 376, an amount 378, and/or a comment 380. The IOU 364/366 can include more or fewer fields than that shown in FIG. 3F, as represented by ellipses 382. A tag 376 can be information that identifies the person or user that is owed money. The tag 376 can include any of the information in the user profile 336, as described in conjunction with FIG. 3D. In an embodiment, the tag 376 includes the friends information 354 described in conjunction with FIG. 3D. In alternative embodiments, the tag 376 can be the same or similar to information in FIGS. 3A and 3B. Regardless, the tag 376 identifies the person that is owed money and may be used in fulfilling the tab or the IOU at a future time.

The amount 378 includes any monetary amount that may represent the debt from the user 102 to the person who is owed money. The amount 378 can be represented in any currency as that currency may be converted by the currency subsystem 214. The comment 380 can be any comment to describe the IOU 364. The comment 380 can include why the IOU is owed or other information that allows for the settlement of the IOU at some future time. The second IOU 366 can be a second debt from the user 102 owed to the same person or to another person. Thus, the tab information 358 can represent transactions between two people or between the user 102 and one or more other people. The second IOU 366 can include the same information as described in FIG. 3F.

A UOME 378 can be a credit owed to the person identified in the name 360 and ID field 362. As such, the UOME 368 can include information that is sent or received from another user about a debt owed by the other user to the person. A UOME 378 can include similar information to that found in FIG. 3F but represent a credit that is owed to the person rather than a debt. The second UOME 370 can have similar information to the first you owe me 368 but may be a transaction or second credit owed to the person either from the same person or from a different person. As such, the UOME 378 represents information about any transaction where the user 102 is owed money.

Settlement information 372 can include any information about how to settle the tabs. As such, the settlement information 372 can include information within the user profile 336 or may include other information that is described in conjunction with FIG. 3A or 3B. Settlement information 372 may be used by the tab subsystem 228 to affect payment or resolution of the tabs amongst two or more users.

Figure 4A:
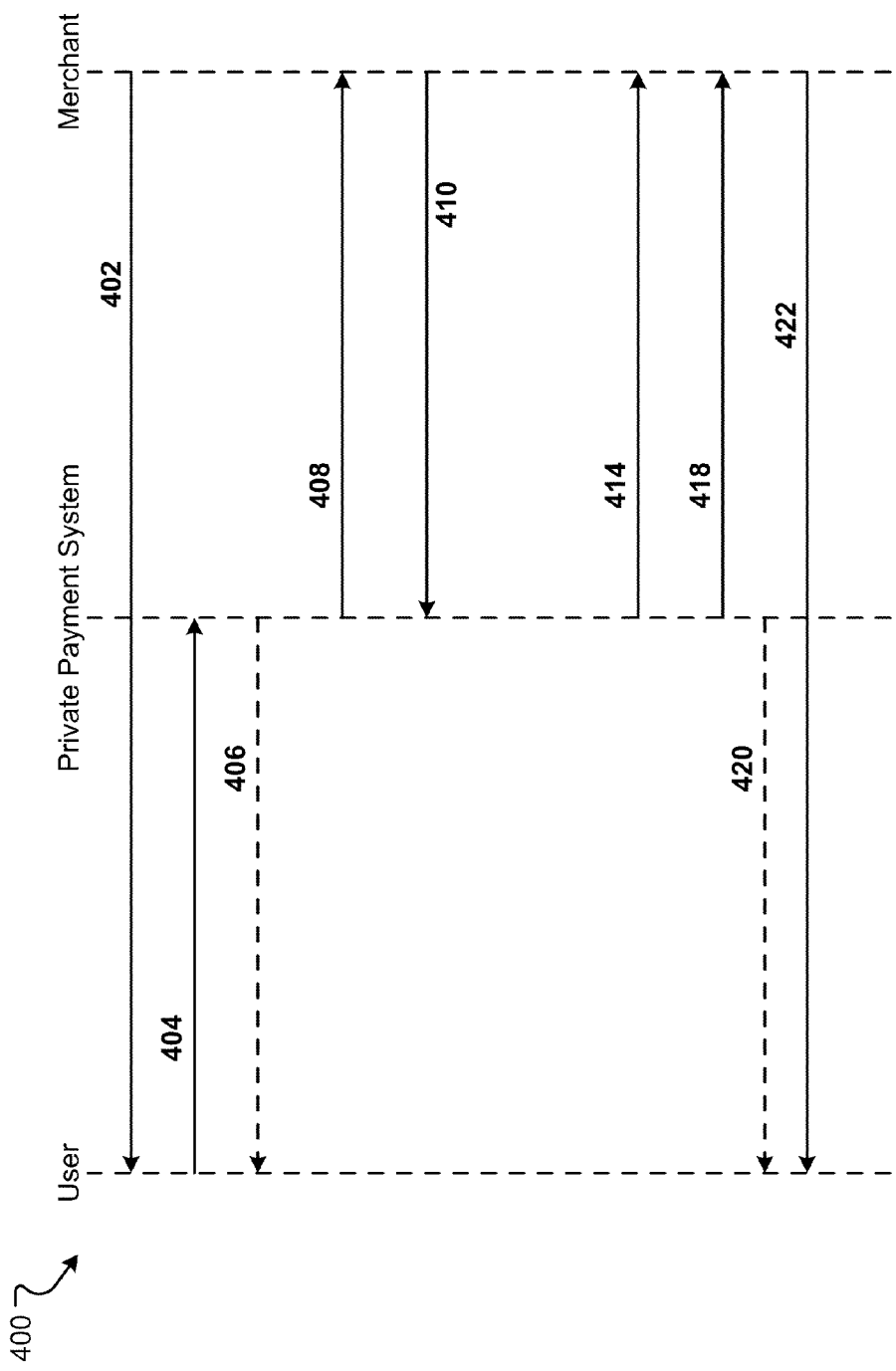
FIGS. 4A through 4D are flow diagrams of an embodiment of a process for conducting a push payment.
Figure 4B:
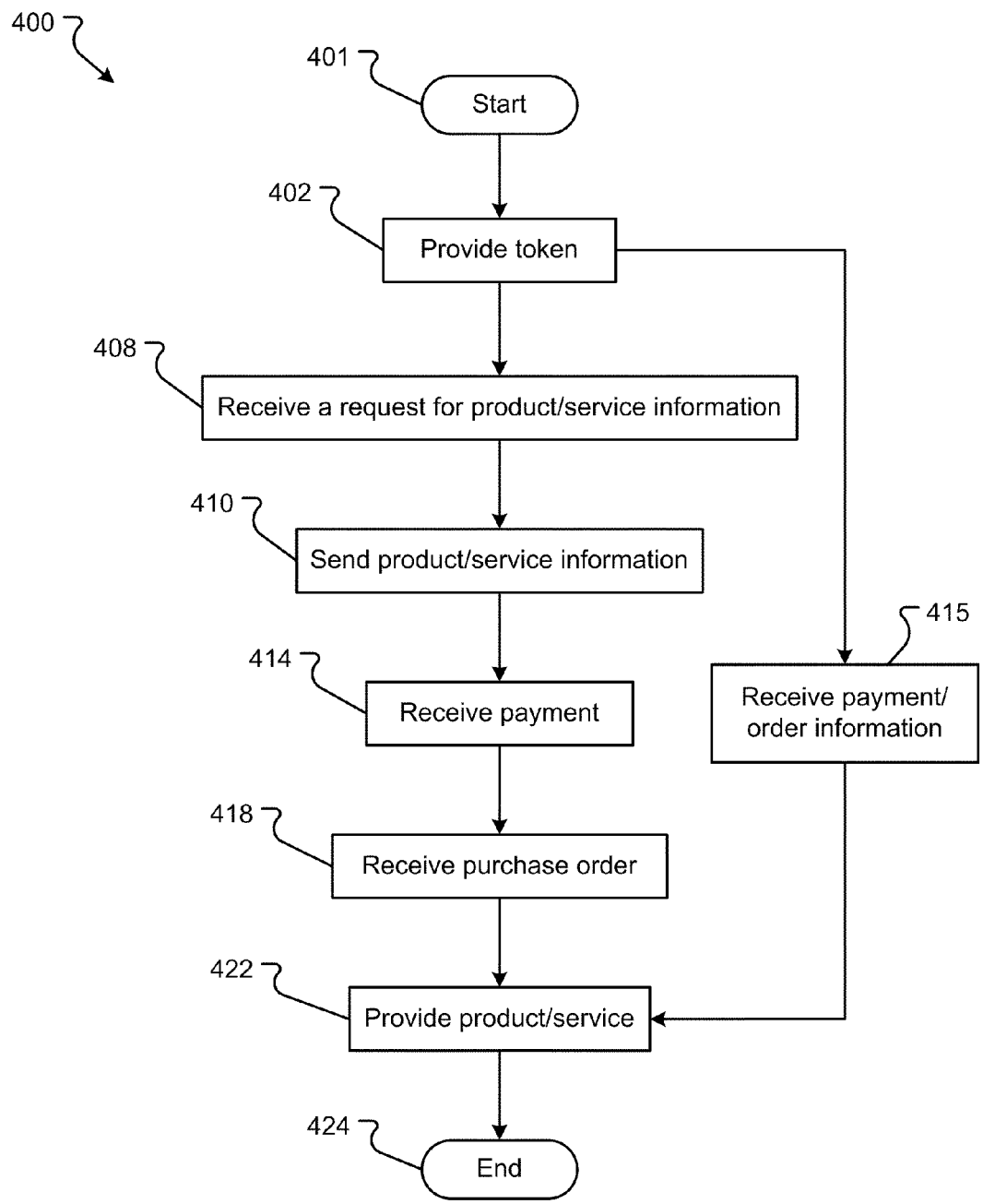
Figure 4C:
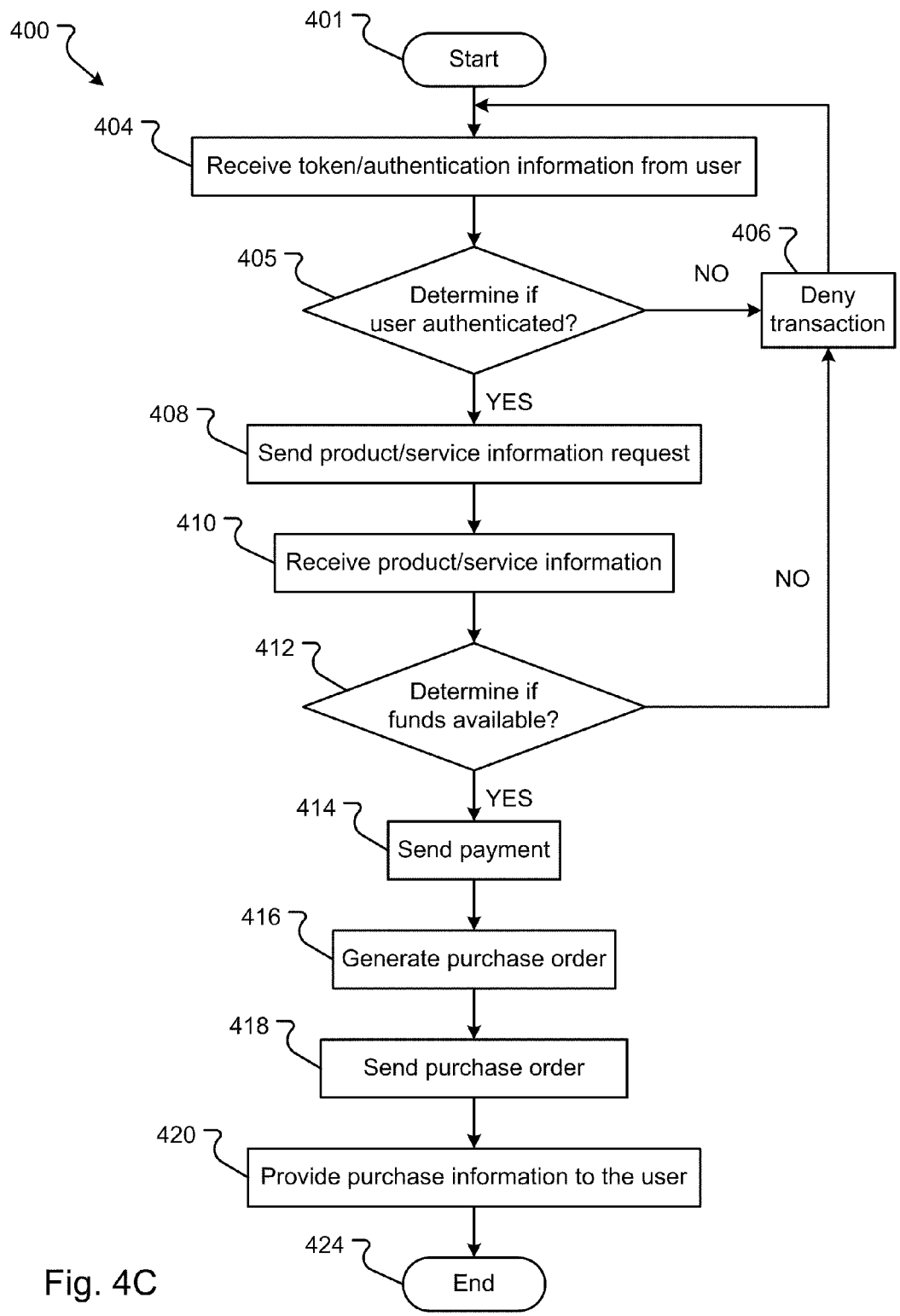
Figure 4D:
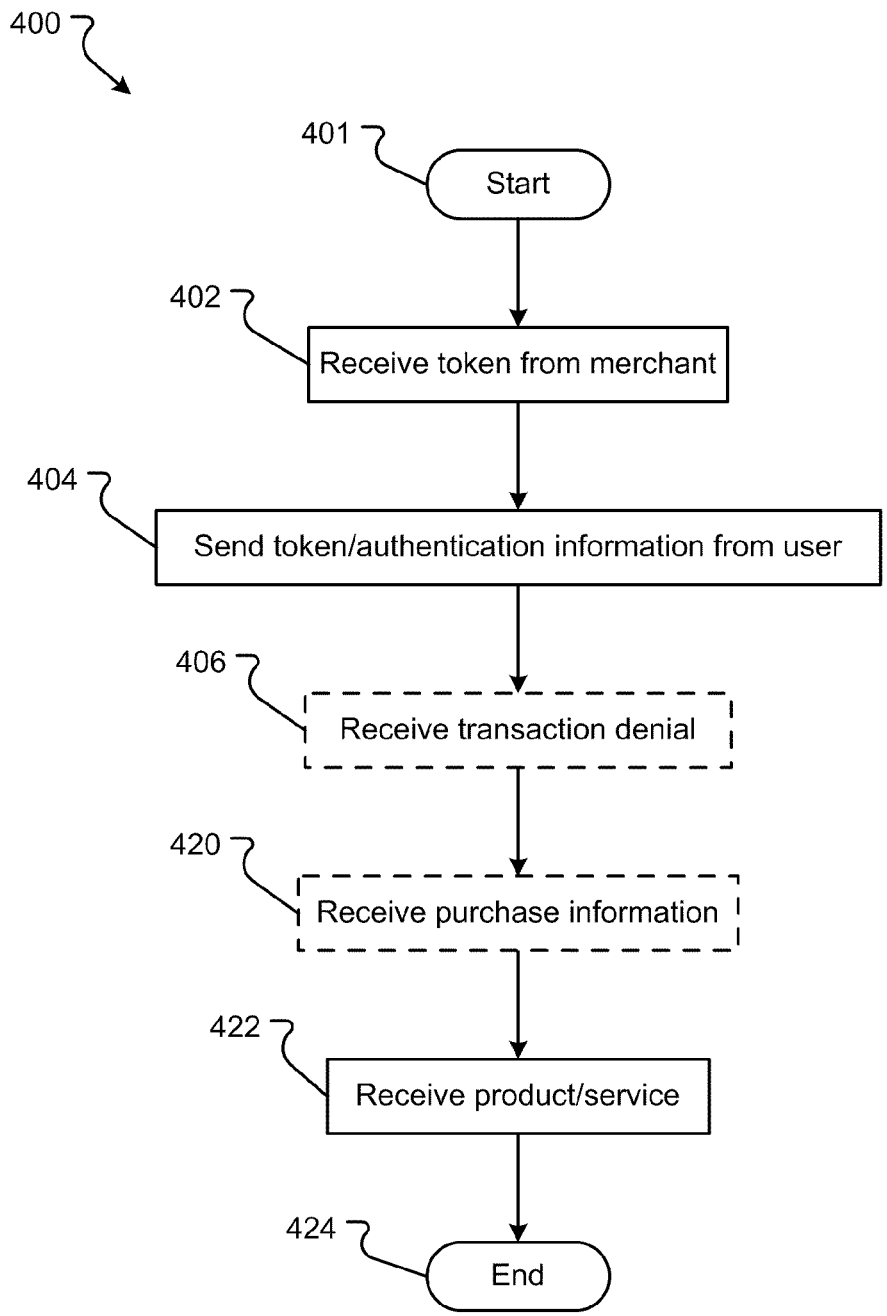

An embodiment of a method 400 for pushing payment from a user 102 to a merchant 112 using tokens is shown in FIGS. 4A through 4D. FIG. 4B shows the method 400 from the perspective of the merchant 112. FIG. 4C shows the method 400 from the perspective of a private payment system 108, and FIG. 4D shows the method 400 from the perspective of a user 102. Generally, the method 400 begins with a start operation 401 and terminates with an end operation 424. While a general order for the steps of the method 400 are shown in FIGS. 4A through 4D, the method 400 can include more or fewer steps or arrange the order of the steps differently than those shown in FIGS. 4A through 4D. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3F.

A merchant 112 provides a token 302, in step 402. The merchant 112 can create a token 302 as described in conjunction with FIGS. 3A through 3C. The token 302 may be provided in numerous ways. For example, the token 302 may be provided in a catalog and be associated with a product marketed within the catalog. In other embodiments, the merchant 112 may provide the token 302 in an advertisement within a periodical, publication, or an Internet page. The token 302 may also be associated with a service or good and may be provided to the user through other sources or methods. Regardless, the merchant sends or provides the token to the user 102. Likewise, the user 102 receives the token from the merchant, in step 402, to begin a transaction to push payment to the merchant to receive the product or service associated with the token.

The user sends the token and, possibly, authentication information to the private payment system 108, in step 404. Thus, the user communicates the information within the token, such as, the payee identity 304 and the product or service 306 associated with the token 302 to the private payment system 108. In embodiments, the user enters the information into a user interface on a user device and sends the token information electronically through a network 110A and gateway 106 to the private payment system 108. The token information may be received through the gateway 106 at a private processing switch 202. Recognizing the users request to purchase a service or good using the token, the private processing switch 202 can send the token to the user system 204.

Further, the private processing switch 202 can receive the authentication information sent, by the user 102, and forward that user authentication information to the user authentication subsystem 226. In step 405, the user authentication subsystem 226 can determine if the user is authenticated. Here, the user authentication subsystem 226 can check received user authentication information against authentication information 348 stored within the user profile 336. If the received authentication information, such as a user name and/or password, is authenticated, step 405 proceeds YES to step 408. However, if the user is not authenticated, step 405 proceeds NO to step 406, where the user is denied the ability to conduct the transaction. As the denial of the transaction is dependent on the user not being authenticated, step 406 is optional. The user authentication subsystem 226 can send an indication, to private processing switch 202, that the user is not authenticated. The private processing switch 202 then sends through, the gateway 106 and network 110, to the user 102 a denial of the transaction. The user can receive the transaction denial, in step 406, to be informed that the customer will not be able to conduct the transaction because the customer was not authenticated. It is possible that the user can resend authentication information, because the authentication information may be entered or provided incorrectly, to retest the authentication or to reaffirm the authentication. Thus, the method flows back to step 404 after the denial of transaction. In other embodiments, the user may end a method 400 after the denial of the transaction.

In step 408, the private processing switch 202 sends the token information to the merchant system 218. The merchant system 218 can then provide the product or service information and payee identity 304 to the token subsystem 202. The token subsystem 202 can create a request for product/service information that is sent to the merchant 112, in step 408. The request sends the product or service information 306 from the token 302 to the payee or merchant 112 identified in the payee identity 304. The request asks the merchant 112 for any information necessary to purchase the product or service. This information may include price or product or service identity. In embodiments, any information necessary to fulfill a purchase order and or complete a payment transaction with a merchant's financial institution 236 is requested. The request is received by the merchant 112. The merchant 112 may process the request and send the product or service information back to the private payment system 108, in step 410. The token subsystem 220 may then provide the information for purchasing the service or good to the private processing switch 202. This information can include any financial information needed for the user system 204 to acquire funds to push a payment to the merchant 112.

After receiving the product or service information from the private processing switch 202, the user system 204 can determine if funds are available to push payment to the merchant's financial institution 236, in step 412. The user profile subsystem 216 can review user information in the fulfillment information 346 and/or account information 352. This information indicates how the user desires to pay for the service or good that is associated with the token. This information is then used by the user system 204 to either check if funds are available with the credit subsystem 210 or the debit subsystem 212. For example, if the users decided to use a credit transaction, the credit subsystem 210 determines if there is currently enough credit to pay for the product or service. In other embodiments, if there is an account associated with the user, the debit subsystem 212 determines if the account has enough funds to pay for the product or service associated with the token. Other payment vehicles or methods for transferring funds are possible and contemplated. It is also possible for the user system 204 to approve payment of a good or service and send the approval but have the actual funding or settlement of the transaction occur at a later time.

In embodiments, the information received from the token subsystem 220 may include a currency that is different than that used with the user system 204. In embodiments, the currency subsystem 214 can convert the currency received with the financial information into a currency used by the credit subsystem 210 or debit subsystem 212. Upon determining if the account associated with the credit subsystem 210 or the debit subsystem 212 has enough funds to pay for the product or service, the user system 204 sends either an approval or a denial of the transaction to the private processing switch 202. If the user system 204 determines the funds are not available, step 412 proceeds NO to step 406 where the transaction is again denied. However, if funds are available, step 412 proceeds YES to step 414.

The private payment system 108 sends payment to the merchant 112, in step 414. Here, the user system 204 sends or provides payment information to the private processing switch 202. For example, the user system 204 can send the information about the funds to the private processing switch 202, which forward the payment information to the payment order subsystem 222. The payment order subsystem 222 then pushes a payment through the private payment fund subsystem 232 to the merchant's financial institution 236. The payment may be sent through an ACH or EFT transaction. As such, the private payment system 108 pushes the funds to the financial institution 236 without any account information of the user being presented to the merchant 112 or the merchant's financial institution 236. Upon completion of the payment, the financial institution may provide back, to the private payment system 108, an indication of whether the funds were properly transferred and payment has been received. This payment information is provided through the PPS fund subsystem 230 back to the payment order subsystem 222. The payment order subsystem 222 then provides the payment information to the private processing switch 202, which may forward this information to the user system 204.

In alternative embodiments, all information about payment and ordering may be sent in a single interaction, in step 415. Here, the order and payment information may be updated by an application periodically in the PPS 108. Thus, the PPS 108 need not ask about the product/service information. Thus, the ordering and payment is streamlined without undue communications.

Upon receiving the confirmation that the payment is received, the payment order subsystem 222 can generate a purchase order, in step 416. The purchase order can include any information necessary for the merchant 112 to complete the transaction or provide the service or good to the user 102. The purchase order can include the payment confirmation and any of the other information associated within the token or associated with the user 102 or token 302 that the merchant 112 may need. Upon completing the generation of the purchase order, the payment order subsystem 222 sends the purchase order to the merchant 112, in step 418. The merchant receives the purchase order, in step 418, and begins the process of providing the service or good to the user. Thus, to complete the purchase order, the merchant 112 provides the user the product or service, in step 422. In embodiments, the payment order system 222 includes any information from the fulfillment subsystem 206 stored in the fulfillment information 346 on the user profile 336. This fulfillment information can include any information needed by the merchant 112 to send the product or service to the user 102. For example, the fulfillment information may include an electronic address to send a software application for the user. Thus all transaction details are completed and the merchant 112 can provide the product or service to the user knowing that payment has been completed. With this system, the user 102 and merchant 112 can complete a transaction without ever exchanging financial information. The user can receive the product or service, in step 422. In embodiments, the user may also receive the purchase information as sent from the private payment system 108 to the financial institution 236, in step 420. Thus, the user receives any information about the transaction and the product or service.

Figure 5A:
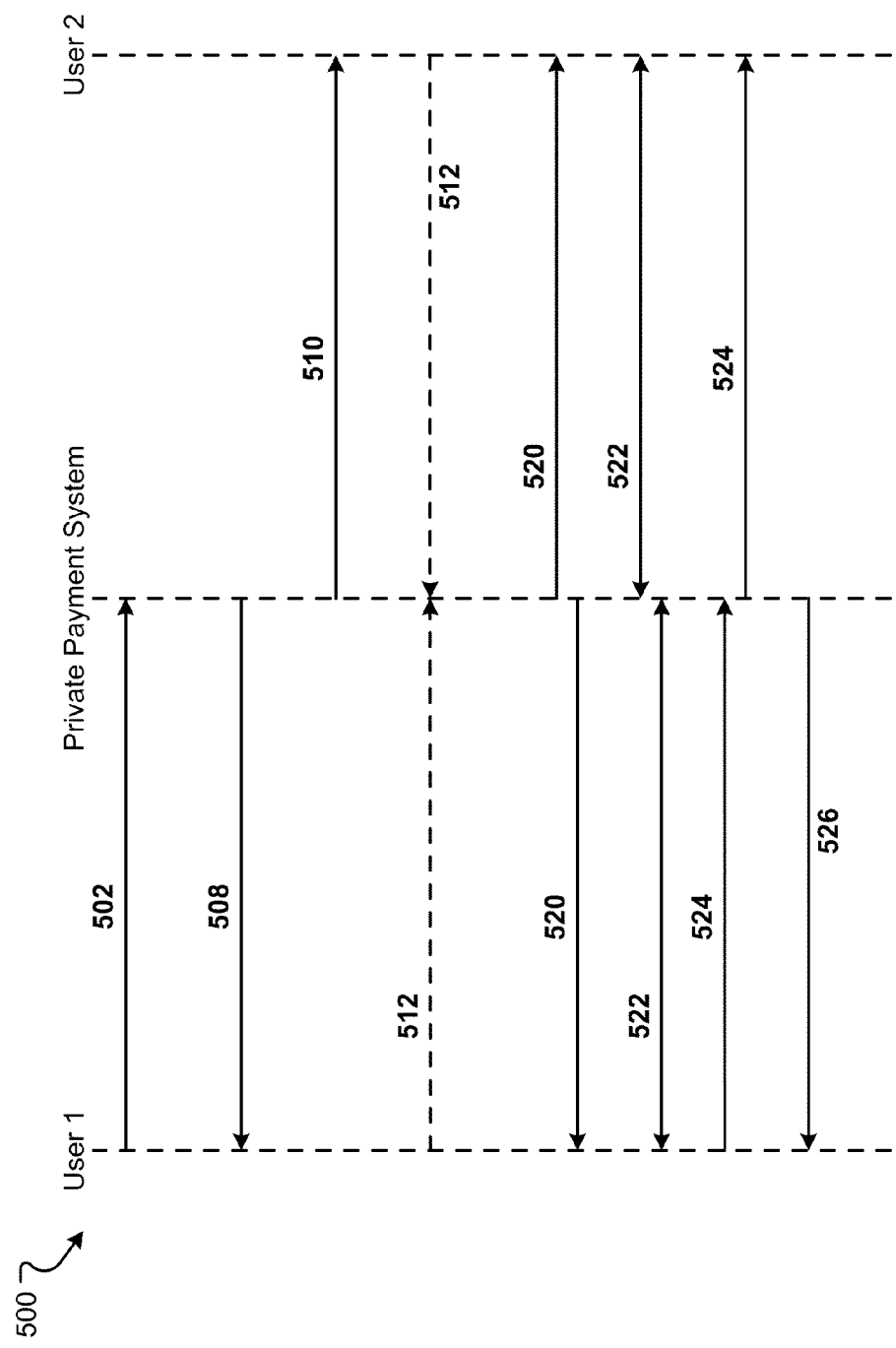
FIGS. 5A through 5C are flow diagrams of an embodiment of a process for creating and settling tabs.
Figure 5B:
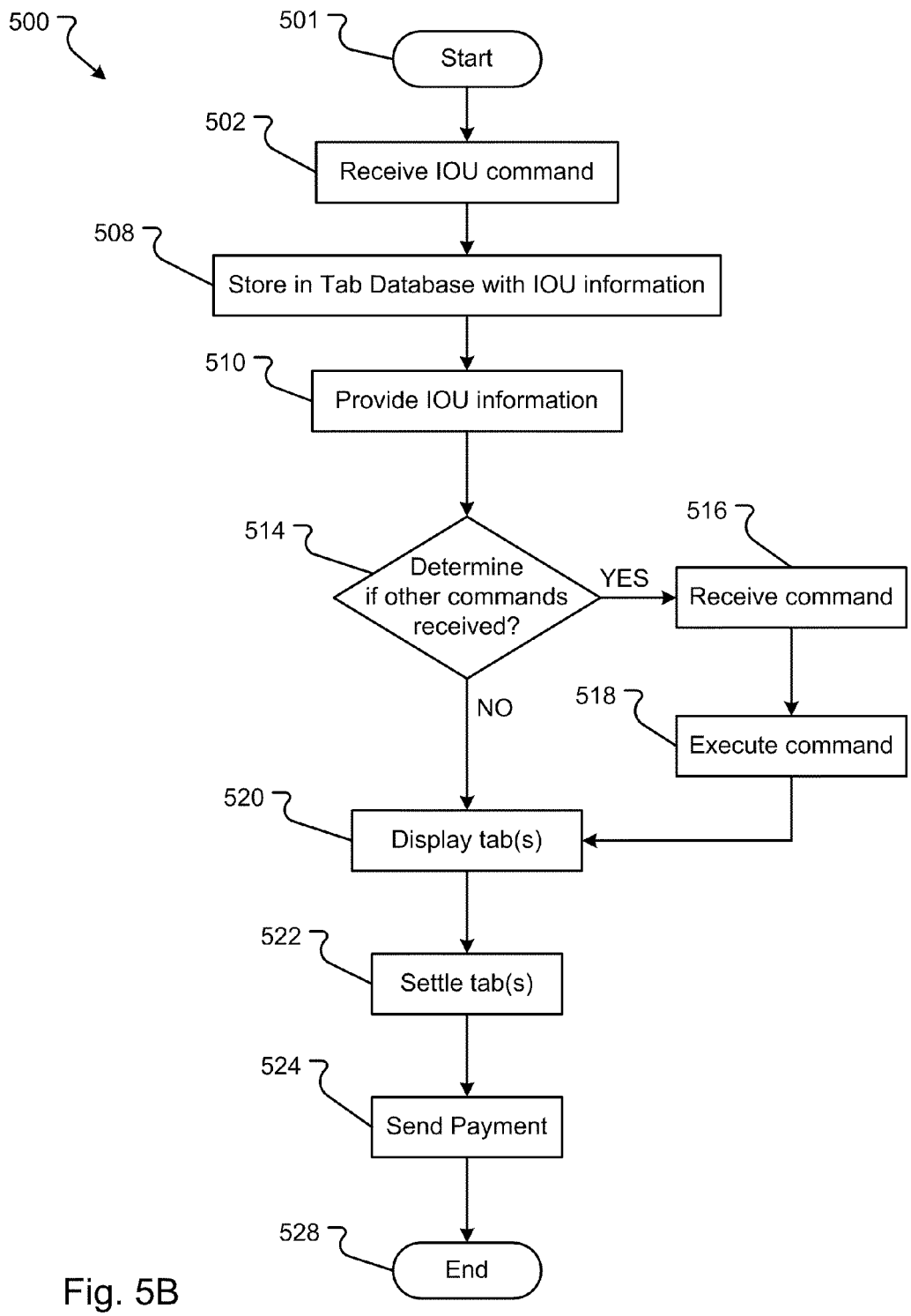
Figure 5C:
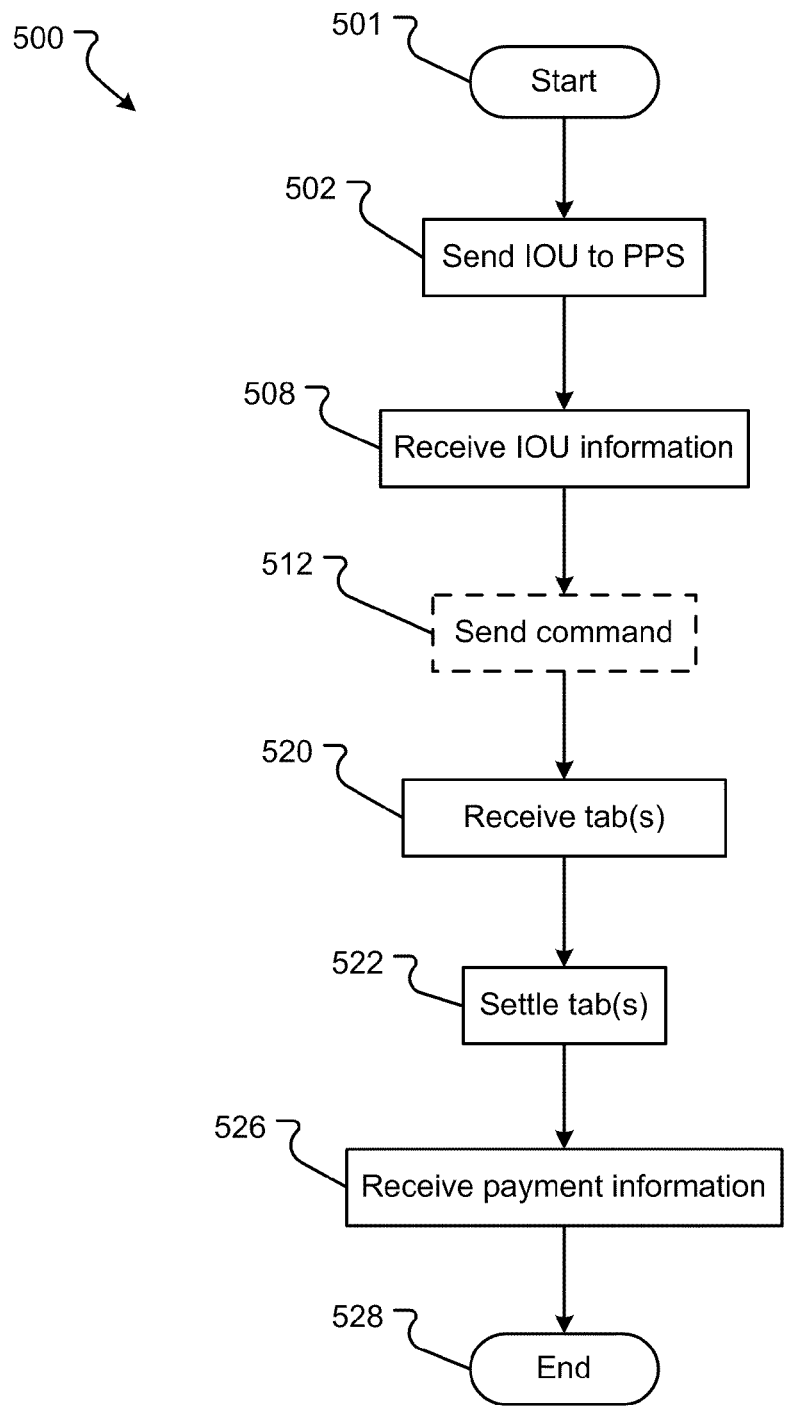

An embodiment of a method 500 for creating tabs with the private payment system 108 is shown in FIGS. 5A through 5C. A tab can be an IOU or you owe me associated between two users 102. Thus, the private payment system 108 provides a method for creating credits or debits between users without the users exchanging financial information. In embodiments, FIG. 5B represents a perspective of the private payment system 108 that organizes the IOUs. In contrast, FIG. 5C represents the perspective of at least one user 102 creating or receiving IOU information. Generally, the method 500 begins with a start operation 502 and terminates with an end operation 528. While a general order for the steps of the method 500 are shown in FIG. 5, the method 500 can include more or fewer steps or the order of the steps may be arranged differently than the method 500 shown in FIG. 5. The method 500 can be a set of computer-executable instructions executed by a computer system or processor and/or encoded or stored on a computer readable medium. Hereinafter, the method 500 shall be explained with reference to the systems, components, modules, data structures, user interfaces, etc. described in conjunction with FIGS. 1-3F.

A user 102 can create an IOU by interfacing with the private payment system 108 through a user device 102, which can include a computer system, smart phone, mobile device, etc. Thus, the user may access a web service or other computer-associated user interface to create an IOU to send to the private processing switch 202. The user then sends the information about the IOU to the private processing switch 202, in step 502. The private processing switch 202 receives the IOU command and IOU information, in step 502. The private processing switch 202 forwards this information to the tab subsystem 228. The tab system 228 creates a tab 358 and stores that tab in the database 114, in step 508. The tab can include one or more of the fields as described in conjunction with FIGS. 3E through 3F. This IOU information is stored in a tab database associated with the user. Upon storing the tab, the tab subsystem 228 can provide the information back to the private processing switch 202 that can communicate the IOU to the first and second user, in step 510. Thus, the private processing switch 202 can send the IOU information as created by the first user, and send that information to the user through the gateway 106 network 110. The first user can receive the IOU information to determine if the IOU was correctly created. Further, the private processing switch 202 can send the IOU information to the second user. The IOU information sent to the second user can appear as a UOME in the tabs database.

The private processing switch 202 may then receive one or more commands from either the first or second user, in step 512. Thus, the first or second user may send a command to affect an action with the tab. The commands can conduct operations regarding the tab subsystem or create new tabs. The private processing switch 108 determines if other commands are received, in step 514. If further commands are received, step 514 proceeds from YES to step 516. If no other commands are received, step 514 proceeds NO to step 520. In step 516, the private processing switch 202 receives the other commands. The private processing switch 202 may then send the command to the tab subsystem 228, which executes the command, in step 518. Examples of the commands that may be received are provided herein after.

An "I owe you" command (IO) can create a tab IOU 364. An IO command can include a "tag" 376, an "amount" 378, and a "comment" 380. The "tag" 376, an "amount" 378, and a "comment" 380 may be as described in conjunction with FIG. 3F. An example of an IO command is: IO Dave 10. With this IO command, the sender is informing the PPS 108 and Dave that the sender owes Dave $10. The tab subsystem 228 opens a tab and notifies Dave and the sender that a tab has been opened and provides a transaction number.

A "You Owe Me" command (UO) can create an OME 368. When a UO command is sent to PPS 108, the tab subsystem 228 can create a UOME tab having similar fields to the IOU, e.g., "tag" 376, an "amount" 378, and a "comment" 380. The "tag" 376, an "amount" 378, and a "comment" 380 may be as described in conjunction with FIG. 3F. An example of such a UO command is: UO Dave 10. With this UO command, the sender is informing the tab subsystem 228 and Dave that Dave owes the sender $10. The tab subsystem 228 opens a tab and notifies Dave and the sender that a tab has been opened and provides a transaction number.

A "reject" command (RJCT) is used to reject a transaction (either an IO or UO). When the RJCT "tag" or RJCT "transaction" is sent, the "tag" identifies the individual whose transaction the sender wishes to reject and "transaction number" identifies the specific transaction (for example, see IO and UO above). In an example, a RJCT Dave tr3 (where tr3 is the transaction number), the tab subsystem 228 identifies the transaction, by first identifying the correct tab, which is indexed by the sender's handle (which might be the mobile number or some other tag), and Dave's handle (once again, mobile number or some other tag). Within this tab, TR3 identifies the transaction in question and thus the amount in question. With this information, the tab subsystem 228 can remove or adjust the tab and then will notify both parties of the change.

The tab command (AB) can be sent by a user to display currently open or unsettled tabs. For example, sending TAB to the PPS 108 will return the following if open tabs: Dave owes you $10; Jim owes you $100; You owe Sue $30, etc. If there are no open tabs, then the tab subsystem 228 responds by saying that there are no open tabs. If the TAB command is sent with a tag, then the tab subsystem 228 returns the transactions associated with the individual identified in the tag. For example, if the sender has an open tab with Dave, then sending the TAB Dave returns: TR1 You owe Dave—$10; TR2 Dave owes you—$20; TR3 Dave owes you—$40 ** rejected; Net—Dave owes you $10. It is possible that some or all of the above commands can occur automatically in an application that keeps a running total of tabs and operates on the tabs to automatically reject, accept, or merge the tabs.

The settle command (STL) is the command for settling a tab. Sending STL tag, where tag is the designation of the individual with whom the sender wishes settle, instructs the tab subsystem 228 that the user wishes to have the tab with the identified person settled. For example, sending the STL Dave command to the PPS 108, the tab subsystem 228 determines the balance of tabs with Dave, if any, and sends an invitation to the party that owes the funds to initiate payment. In this case, Dave would get a message saying the he owes the sender of the settle command $10. If there is no tab open, then the tab subsystem 228 sends the sender a message and invites the sender to use the tab command to identify open tabs. The tab subsystem 228 will remind Dave periodically if the payment associated with this tab is not paid. After some number of days, the sender has the option to "forgive" the tab, which will result in the tab subsystem 228 not sending any additional reminders.

The PAY command would be used to pay another individual a certain amount. Sending the PAY command can be formatted with a "tag," and "amount," and a "PIN," where tag and amount are as described with the IOU and the PIN is a password or personal identification number setup by the sender ahead of time.

A block command (BLK) can be used to block all transactions from a certain mobile number or other user. The format of the command is BLK "tag," where the tag may be the number of the mobile number to block. An unblock command (UNBLK) will allow transactions from a previously blocked mobile number. The format of the command is UNBLK "tag," where the tag may be the number of the mobile number to unblock.

A balance command (BAL) can be used to check the balance in an account. The format for the BAL command is BAL, "PIN," where PIN is the password or personal Identification number discussed earlier.

A gift command is for sending a gift to another user. The format for this command is gift, "tag," "optional message," "optional destination," where tag is the recipient, the message (which is optional) contains a greeting (have a nice day, happy birthday etc.), and destination designates where the funds are to go. For example, the tag or receiver may have setup a prepaid card or gift card from a merchant (e.g. Starbucks) and the sender may wish to buy the recipient (tag) a cup of coffee from Starbucks. Without a destination, the tab subsystem 228 credits the receiver's account with the cash.

After all commands and IOUs are created, the tab subsystem 228 can display the tabs, in step 520. To display the tabs, the tab subsystem 228 can create a user-centric view of the IOUs or UOMEs associated with the user 102. Thus, any information regarding the IOUs or UOMEs may be created and provided in a user interface to the user 102, such that, the user can view IOUs or UOMEs by who the debt is owed or by who owes the UOMEs. The user may view this information or see the tabs, in step 520. Upon receiving the tabs, or at some point thereinafter, the user 102 may decide to pay for the debts or receive money for the credits.

The user 102 can settle tabs, in step 522. In settling a tab, the user 102 pays for any IOUs or requests payment for any UOMEs. The settlement may be sent to the private processing switch 202, which is forwarded to the tab subsystem 228. Depending on how the user decides to settle the IOUs and UOMEs, the tab subsystem 228 may calculate or resolve the debts and credits internally. For example, any credits owed by one party may be used to balance any debts owed to that party. Thus, the total amount, which is a balance of all credits and debts, may be established by the tab subsystem 228. Upon determining whether an amount is owed to another party or another party owes the user 102, the tab subsystem 228 may forward this information, through the private processing switch 202, to the user system 102, in step 522. The user system may then request payment or make a payment through the credit subsystem or debit subsystem to another user 102. Thus, payment may be sent, in step 524, by the user system 204 to another user's financial institution or to the user's accounts within the private payment system 108. As such, the user can push payment to another user without exchanging any financial information with that user. Upon completing payment for the tabs, the user system may generate payment information, which may be sent through the private processing switch 202 to the user 102, in step 526. Upon receiving payment information the user has completed the settlement of the tabs. It should be noted that the tabs and the commands associated therewith can be implemented through an application, SMS, IM, email, etc. Further, the operations executed on the tabs can be combined and presented in convenient user interfaces to the user.

FIG. 6 illustrates a block diagram of a computing environment 600 that may function as system or environment for the embodiments described herein. The system 600 includes one or more user computers 605, mobile devices 610 (e.g., mobile phones, smart phones, tablet computers, etc.), and other user computing systems 615. The user computers 605, 610, and 615 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary system 600 is shown with three user computers, any number of user computers may be supported.

System 600 further includes a network 620. The network 620 can be any type of network familiar to those skilled in the art that can support data communications using any of a variety of commercially-available protocols, including, without limitation, TCP/IP, SNA, IPX, AppleTalk, and the like. Merely by way of example, the network 620 maybe a local area network ("LAN"), such as an Ethernet network, a Token-Ring network and/or the like; a wide-area network; a virtual network, including, without limitation, a virtual private network ("VPN"); the Internet; an intranet; an extranet; a public switched telephone network ("PSTN"); an infra-red network; a wireless network (e.g., a network operating under any of the IEEE 802.11 suite of protocols, networks operating in compliance with the Bluetooth™ protocol known in the art, and/or any other wireless protocol); and/or any combination of these or other networks.

The system 600 may also include one or more server computers 625, 630. One server may be a web server 625, which may be used to process requests for web pages or other electronic documents from user computers 605, 610, and 615. The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish operations available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™ or C++, and/or any scripting language, such as Perl, Python, MySQL, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 5 illustrates a separate web server 625 and file/application server 630, those skilled in the art will recognize that the functions described with respect to servers 625, 630 may be performed by a single server and/or a plurality of specialized servers, depending on implementation-specific needs and parameters. The computer systems 605, 610, and 615, file server 625 and/or application server 630 may function as servers or other systems described herein.

The system 600 may also include a database 635. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands. Database 635 may be the same or similar to the database used herein.

FIG. 7 illustrates one embodiment of a computer system 700 upon which servers or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage devices 720. By way of example, storage device(s) 720 may be disk drives, optical storage devices, solid-state storage device, such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750, such as program code implementing the servers or devices described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

There are several examples where the PPS 108 can be used for transactions. In an example, a concert promoter or even the band or orchestra can sign-up with PPS 108 to make their performance or recordings available to members in the audience who are also users of PPS 108. The producer of the show or even the band or orchestra is assigned a merchant code when they sign up with PPS 108. They can also assign SKU numbers to their products (live music as well as pre-recorded). The combination of the merchant code and SKU number will now constitute the token. An audience member, during the show, can use their mobile device to place an order for music (either the live version or pre-recorded) by using the appropriate token for the particular piece of music. The PPS 108 will process the transaction and deliver the music to their email address or even mobile device.

In another example, a charitable or non-profit organization can sign-up for a merchant/organization code and an event code that can both be advertised to the public. Users of PPS 108 can then make charitable donations to these organizations without disclosing payment information. For example, a pledge drive, by a public TV or radio station, can be advertised by announcing the PPS 108 token in addition to traditional payment methods. A PPS 108 user can then "push" a payment to that organization without disclosing that user's payment information. A charitable organization wishing to raise funds to help the needy after a catastrophe can advertise their organization code along with an event code that is tied to that particular catastrophe thereby allowing users of PPS 108 to donate impulsively and without compromising or disclosing their payment information. Examples of such organizations might include National Public Radio, the Redcross, various churches, temples, political organizations, etc.

In another example, a political campaign could sign-up for a token with PPS 108 that could be advertised at a rally (political, religious etc.). Audience members, who are members of PPS 108, can donate funds to that token without ever disclosing their payment information.

In another example, a radio or TV channel (station) could sign-up for a merchant token and setup a SKU number for their products. For example, a shopping network can sign-up, with the PPS 108, for a merchant code and utilize their existing product numbers to create the token. A music TV station can also sign-up for a merchant code and assign a SKU number to the music videos that they play. A radio station can sign-up for a merchant code and setup a SKU number for each piece of music that they play. A PPS 108 user who listens to that radio station or views that channel can use PPS 108 to purchase that product, music or video just by using the assigned tokens but without disclosing their payment information.

In another example, an internet merchant can sign-up for a PPS 108 merchant code. When a PPS 108 user is ready to pay for purchases, he or she can select PPS 108 as one of the payment options. The merchant's system notifies PPS 108 of the purchase amount and other information, including SKU numbers for products in the user's shopping cart, and PPS 108 generates a one-time only invoice number and sends it to the merchant. The user then uses the merchant number and this one-time invoice number as the tokens and makes the payment via PPS 108 without disclosing the user's payment information to the merchant thereby reducing if not eliminating the threat of identity theft.

A brick-and-mortar merchant would also PPS 108 the very same way. A merchant would sign-up for a PPS 108 merchant code. At check-out time, the final settlement amount and invoice are electronically transmitted to PPS 108 which in turn generates a token that is sent to the POS terminal. The cashier provides the token to the user who then facilitates a payment by sending the token to PPS 108. Upon reception of the token, PPS 108 authenticates the users and issues either a payment or credit to the merchant and notifies that POS terminal. Once again, the user's information is not disclosed to the cashier.

In another example, a visitor to a store could identify an item of interest and make an electronic purchase as follows (i.e. not use the store's point of sale or cashier): The customer sends product SKU or name or some other product description along with the merchant code to PPS 108 and PPS 108 can facilitate not only the purchase but also delivery of that item to the buyer's home or to someone else (in the network as described below). Such a capability allows the customer the ability to avoid waiting in line at the cashier and perhaps even dealing with taking possession of large and cumbersome items. Of course, the purchaser may also send the product description to a competing retailer or even a comparative shopping site and make a purchase from the competing retailer.

In another example, a publisher can sign-up with PPS 108 to facilitate rapid and spontaneous purchase of the publisher's products. Such a purchase maybe facilitated during promotional events that are hosted on television (shows such as the Oprah Winfrey show), newspaper advertisements as well as radio events, internet events and even mobile phone events.

In another example, a network marketing company can sign-up with PPS 108 to allow their customers to rapidly and spontaneously make purchases from catalogs as well as purchase events held at the homes of sellers of such products.

In one example, a group of individuals might go for a night out, a picnic, a weekend ski trip, a trip to the beach or some other activity. As is often the case, different individuals pay for different products or services (e.g. one individual pays for the cabin, another buys all the ski lift tickets, another rents the cars or van and another might pay for show tickets). Often, these expenses are tallied at the end of the trip and settled using cash or check. PPS 108 provides a capability for individuals to open and maintain tabs between individuals, populate the tabs using "I owe you" and "you owe me" commands, settle the tab (calculate who owe how much and to whom) and then push payments to the appropriate individuals.

In another example, a group of individuals might like to go together to a sporting event, a concert, a movie, a play etc. One individual might purchase the tickets for the whole group and collect payment from the other individuals in the group. In this case, PPS 108 can be used by the buyer to open a tab with each individual in the group where the buyer sends "you owe me" commands to the others through PPS 108 or by the others sending "I owe you" commands or a combination of both. The individuals can then use PPS 108 to settle the "tab" at an appropriate time and pay the owed amounts.

Similarly, in another example, a group of parents might wish to purchase a thank-you gift for a teacher. Once again, one individual can purchase the gift on behalf of all the parents and then use PPS 108 to settle payment.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A method, comprising:
  providing a private payment computer system associated with a purchaser, the private payment computer system comprising one or more file servers and/or application servers, a gateway, and a database, in communication with one another, the private payment computer system further comprising hardware elements electrically coupled via a bus, the hardware elements including one or more central processing units to execute a program and/or script for the one or more file servers and/or application servers and a non-transitory computer readable storage medium storing the database and instructions for the program and/or script;
  creating, by the private payment computer system, at least part of a token for a merchant offering a product and/or service to be purchased by the purchaser, the token including (a) a payee identifier that (i) identifies financial information of the merchant, the merchant financial information comprising one or more of a universal payment identification code associated with the merchant, a financial institution account number of the merchant, and a routing number of a financial institution of the merchant and (ii) includes one or more of a unique merchant name, a globally unique identifier of the merchant, an alpha numeric number associated with the merchant, a specialized name or abbreviation of the merchant, and a phone number of the merchant, and (b) a product and/or service identifier that identifies the product and/or service associated with the merchant;

during a transaction by the purchaser to purchase the product and/or service, receiving, at the gateway of the private payment computer system directly from a computing system of the purchaser and through a communication network, the token and authentication information of the purchaser;

authenticating, by the one or more file servers and/or application servers of the private payment computer system, the purchaser using the received authentication information;

when the purchaser is authenticated successfully, retrieving, by the one or more file servers and/or application servers of the private payment computer system, merchant information from the database via the one or more database servers, the retrieved merchant information associated with the merchant;

sending, by the one or more file servers and/or application servers of the private payment computer system and using the retrieved merchant information, a request for further information to a merchant system of the merchant about the product and/or service associated with the token;

receiving, by the one or more file servers and/or application servers of the private payment computer system, the requested further information from the merchant system;

after verification that an account of the purchaser has funds available to pay for the product and/or service and upon completion of the payment transfer from an account of the purchaser to an account of the merchant, performing at least one of the following:
  sending, by the one or more file servers and/or application servers of the private payment computer system, to the merchant system, an electronic purchase order for the product and/or service associated with the token and identified by the product and/or service identifier; and
  sending, by the one or more file servers and/or application servers of the private payment computer system, electronic payment confirmation that funds have been transferred from an account of the purchaser to an account identified at least in part by the payee identifier.

2. The method as defined in claim 1, wherein an electronic purchase order is sent to the merchant system, wherein the purchase order includes fulfillment information describing how to provide the product and/or service associated with the token, and wherein the product and/or service is provided to the purchaser in conformance with the fulfillment information.

3. The method as defined in claim 2, wherein a payment is pushed to the merchant financial institution.

4. The method as defined in claim 3, wherein the electronic payment confirmation is generated from the payment being pushed to the merchant financial institution.

5. The method as defined in claim 4, wherein the merchant does not receive account information from the purchaser when the payment is pushed to the financial institution.

6. The method of claim 1, further comprising:
  sending, by the one or more file servers and/or application servers of the private payment computer system, to the merchant system the electronic purchase order for the product and/or service associated with the token and identified by the product and/or service identifier.

7. The method of claim 1, wherein the one or more file servers and/or application servers of the private payment computer system comprise a plurality of a web server, a database server, web application server, and file server, wherein the private payment computer system comprises one or more user input devices comprising one or more of a mouse and keyboard and one or more user output devices comprising of a display device and printer, wherein the one or more central processing units comprise a processing acceleration unit, wherein the private payment computer system comprises one or more of a modem, network card, and infra-red communication device, and wherein the computer readable storage medium comprises one or more of a read only memory and a random access memory and one or more of a magnetic storage medium, optical storage medium, and solid-state storage device.

8. The method of claim 1, wherein the purchaser authentication information comprises a password, username, or personal identification number of the purchaser and an electronic address of the purchaser's computing system.

9. The method of claim 8, wherein the token comprises one or more of a stock keeping unit number of the product and/or service of the merchant, a unique name of the product and/or service, a merchant catalog number, and price information of the product and/or service.

10. The method of claim 1, wherein the private payment computer system performs the receiving, authenticating, retrieving, and performing without the purchaser providing purchaser financial account information to the merchant or merchant system.

11. The method of claim 1, further comprising:
  retrieving merchant information associated with the payee identifier; and
  sending payment to a financial institution associated with the merchant and at least partly identified by the payee identifier in the token.

12. The method of claim 1, wherein the token is received by the gateway of the private payment computer system from the purchaser's computing system through the Internet and wherein, during transmission of the token from the purchaser's computing system to the private payment computer system, the token does not pass through the merchant system.

13. The method of claim 1, wherein the purchaser's computing system obtains the token by one or more of manual input via a user interface by the purchaser and via a web browser from an Internet page provided by a web server of the merchant system.

14. The method of claim 1, wherein the private payment computer system generates the entire token and provides the token to the merchant system during the purchase transaction between the purchaser and merchant and wherein the merchant system provides the token to the purchaser's computing system to forward to the private payment computer system.

15. A method, comprising:
providing a private payment computer system associated with a purchaser, the private payment computer system comprising one or more file servers and/or application servers, a gateway, and a database, in communication with one another, the private payment computer system further comprising hardware elements electrically coupled via a bus and/or network, the hardware elements including one or more central processing units to execute a program and/or script for the one or more file servers and/or application servers and a non-transitory computer readable storage medium storing the database and instructions for the program and/or script;
creating, by the private payment computer system, at least part of a token for a merchant offering a product and/or service to be purchased by the purchaser, the token including (a) a payee identifier that (i) identifies financial information of the merchant, the merchant financial information comprising one or more of a universal payment identification code associated with the merchant, a financial institution account number of the merchant, and a routing number of a financial institution of the merchant and (ii) includes one or more of a unique merchant name, a globally unique identifier of the merchant, an alpha numeric number associated with the merchant, a specialized name or abbreviation of the merchant, and a phone number of the merchant, and (b) a product and/or service identifier that identifies the product and/or service associated with the merchant;
during a transaction by the purchaser to purchase the product and/or service, receiving, at the gateway of the private payment computer system directly from a computing system of the purchaser and through a communication network, the token and authentication information of the purchaser;
authenticating, by the one or more file servers and/or application servers of the private payment computer system, the purchaser using the received authentication information;
when the purchaser is authenticated successfully, retrieving, by the one or more file servers and/or application servers of the private payment computer system, merchant information from the database via the one or more database servers, the retrieved merchant information associated with the merchant;
after verification that an account of the purchaser has funds available to pay for the product and/or service and upon completion of the payment transfer from an account of the purchaser to an account of the merchant, performing at least one of the following:
sending, by the one or more file servers and/or application servers of the private payment computer system, to the merchant system, an electronic purchase order for the product and/or service associated with the token and identified by the product and/or service identifier; and
sending, by the one or more file servers and/or application servers of the private payment computer system, electronic payment confirmation that funds have been transferred from an account of the purchaser to an account identified at least in part by the payee identifier.

16. The method of claim 15, further comprising:
sending, by the one or more file servers and/or application servers of the private payment computer system, the electronic payment confirmation that funds have been transferred from an account of the purchaser to an account identified at least in part by the payee identifier.

17. The method of claim 15, wherein the one or more file servers and/or application servers of the private payment computer system comprise a plurality of a web server, a database server, web application server, and file server, wherein the private payment computer system comprises one or more user input devices comprising one or more of a mouse and keyboard and one or more user output devices comprising of a display device and printer, wherein the one or more central processing units comprise a processing acceleration unit, wherein the private payment computer system comprises one or more of a modem, network card, and infra-red communication device, and wherein the computer readable storage medium comprises one or more of a read only memory and a random access memory and one or more of a magnetic storage medium, optical storage medium, and solid-state storage device.

18. The method of claim 15, wherein the purchaser authentication information comprises a password, username, or personal identification number of the purchaser and an electronic address of the purchaser's computing system.

19. The method of claim 18, wherein the token comprises one or more of a stock keeping unit number of the product and/or service of the merchant, a unique name of the product and/or service, a merchant catalog number, and price information of the product and/or service.

20. The method of claim 15, wherein the private payment computer system performs the receiving, authenticating, retrieving, and performing without the purchaser providing purchaser financial account information to the merchant or merchant system.

21. The method of claim 15, further comprising:
retrieving merchant information associated with the payee identifier; and
sending payment to a financial institution associated with the merchant and at least partly identified by the payee identifier in the token.

22. The method of claim 15, wherein the token is received by the gateway from the purchaser's computing system through the Internet and wherein, during transmission of the token from the purchaser's computing system to the private payment computer system, the token does not pass through the merchant system.

23. The method of claim 15, wherein the purchaser's computing system obtains the token by one or more of manual input via a user interface by the purchaser and via a web browser from an Internet page provided by a web server of the merchant system.

24. The method of claim 15, wherein the private payment computer system generates the entire token and provides the token to the merchant system during the purchase transaction between the purchaser and merchant and wherein the merchant system provides the token to the purchaser's computing system to forward to the private payment computer system.

25. A private payment computer system, comprising:
one or more central processing units to execute a program and/or script for one or more file servers and/or application servers;
a non-transitory computer readable storage medium storing the instructions;
a gateway to send communications to and receive communications from a communications network; and
a bus electrically coupling the one or more central processing units, and the non-transitory computer readable storage medium,
the non-transitory computer readable storage medium comprising the program and/or script that, when executed by the one or more central processing units, cause the one or more central processing units to:

create at least part of a token for a merchant offering a product and/or service to be purchased by a purchaser, the token including (a) a payee identifier that (i) identifies financial information of the merchant, the merchant financial information comprising one or more of a universal payment identification code associated with the merchant, a financial institution account number of the merchant, and a routing number of a financial institution of the merchant and (ii) includes one or more of a unique merchant name, a globally unique identifier of the merchant, an alpha numeric number associated with the merchant, a specialized name or abbreviation of the merchant, and a phone number of the merchant, and (b) a product and/or service identifier that identifies the product and/or service associated with the merchant;

during a transaction by the purchaser to purchase the product and/or service, receive, directly from a computing system of the purchaser and through the communication network, the token and authentication information of the purchaser;

authenticate the purchaser using the received authentication information;

when the purchaser is authenticated successfully, retrieve merchant information from the database via the one or more database servers, the retrieved merchant information associated with the merchant; and after verification that an account of the purchaser has funds available to pay for the product and/or service and upon completion of the payment transfer from an account of the purchaser to an account of the merchant, perform at least one of the following:

send to the merchant system, an electronic purchase order for the product and/or service associated with the token and identified by the product and/or service identifier; and send electronic payment confirmation that funds have been transferred from an account of the purchaser to an account identified at least in part by the payee identifier.

26. The private payment computer system of claim 25, wherein the one or more central processing units:

send, using the retrieved merchant information, a request for further information to a merchant system of the merchant about the product and/or service associated with the token; and receive the requested further information from the merchant system.

27. The private payment computer system of claim 25, wherein the one or more file servers and/or application servers comprise a plurality of a web server, a database server, web application server, and file server, wherein the private payment computer system comprises one or more user input devices comprising one or more of a mouse and keyboard and one or more user output devices comprising of a display device and printer, wherein the one or more central processing units comprise a processing acceleration unit, wherein the private payment computer system comprises one or more of a modem, network card, and infra-red communication device, and wherein the non-transitory computer readable storage medium comprises one or more of a read only memory and a random access memory and one or more of a magnetic storage medium, optical storage medium, and solid-state storage device.

28. The private payment computer system of claim 25, wherein the purchaser authentication information comprises a password, username, or personal identification number of the purchaser and an electronic address of the purchaser's computing system.

29. The private payment computer system of claim 28, wherein the token comprises one or more of a stock keeping unit number of the product and/or service of the merchant, a unique name of the product and/or service, a merchant catalog number, and price information of the product and/or service.

30. The private payment computer system of claim 25, wherein the receiving, authenticating, retrieving, and performing operations are performed without the purchaser providing purchaser financial account information to the merchant or merchant system.

31. The private payment computer system of claim 25, wherein the one or more central processing units:

retrieve merchant information associated with the payee identifier; and send payment to a financial institution associated with the merchant and at least partly identified by the payee identifier in the token.

32. The private payment computer system of claim 25, wherein the token is received by the gateway from the purchaser's computing system through the Internet and wherein, during transmission of the token from the purchaser's computing system to the private payment computer system, the token does not pass through the merchant system.

33. The private payment computer system of claim 25, wherein the purchaser's computing system obtains the token by one or more of manual input via a user interface by the purchaser and via a web browser from an Internet page provided by a web server of the merchant system.

34. The private payment computer system of claim 25, wherein the private payment computer system generates the entire token and provides the token to the merchant system during the purchase transaction between the purchaser and merchant and wherein the merchant system provides the token to the purchaser's computing system to forward to the private payment computer system.

35. A non-transitory computer readable storage medium comprising:

one or more instructions that, when executed by one or more central processing units of a private payment computer system associated with a purchaser, create at least part of a token for a merchant offering a product and/or service to be purchased by the purchaser, the private payment computer system comprising one or more file servers and/or application servers, a gateway, and a database, in communication with one another and further comprising hardware elements electrically coupled via a bus and/or network, the hardware elements including the one or more central processing units to execute a program and/or script for the one or more file servers and/or application servers, and the non-transitory computer readable storage medium storing the instructions and database and the token including (a) a payee identifier that (i) identifies financial information of the merchant, the merchant financial information comprising one or more of a universal payment identification code associated with the merchant, a financial institution account number of the merchant, and a routing number of a financial institution of the merchant and (ii) includes one or more of a unique merchant name, a globally unique identifier of the merchant, an alpha numeric number associated with the merchant, a specialized name or abbreviation of the merchant, and a phone number of the merchant, and (b) a product and/or service identifier that identifies the product and/or service associated with the merchant;

one or more instructions that, when executed by the one or more central processing units of the private payment computer system, receive, during a transaction by the purchaser to purchase the product and/or service, directly from a computing system of the purchaser, and through the communication network, the token and authentication information of the purchaser;

one or more instructions that, when executed by the one or more central processing units of the private payment computer system, authenticate the purchaser using the received authentication information;

one or more instructions that, when executed by the one or more central processing units of the private payment computer system, retrieve, when the purchaser is authenticated successfully, merchant information from the database via the one or more database servers, the retrieved merchant information associated with the merchant; and one or more instructions that, when executed by the one or more central processing units of the private payment computer system, perform, after verification that an account of the purchaser has funds available to pay for the product and/or service and upon completion of the payment transfer from an account of the purchaser to an account of the merchant, at least one of the following functions:

send to the merchant system, an electronic purchase order for the product and/or service associated with the token and identified by the product and/or service identifier; and send electronic payment confirmation that funds have been transferred from an account of the purchaser to an account identified at least in part by the payee identifier.

36. The non-transitory computer readable storage medium of claim 35, further comprising:
one or more instructions that, when executed by the one or more central processing units of the private payment computer system, send, using the retrieved merchant information, a request for further information to a merchant system of the merchant about the product and/or service associated with the token; and
one or more instructions that, when executed by the one or more central processing units of the private payment computer system, receive the requested further information from the merchant system.

37. The non-transitory computer readable storage medium of claim 35, wherein the one or more file servers and/or application servers comprise a plurality of a web server, a database server, web application server, and file server, wherein the private payment computer system comprises one or more user input devices comprising one or more of a mouse and keyboard and one or more user output devices comprising of a display device and printer, wherein the one or more central processing units comprise a processing acceleration unit, wherein the private payment computer system comprises one or more of a modem, network card, and infra-red communication device, and wherein the non-transitory computer readable storage medium comprises one or more of a read only memory and a random access memory and one or more of a magnetic storage medium, optical storage medium, and solid-state storage device.

38. The non-transitory computer readable storage medium of claim 35, wherein the purchaser authentication information comprises a password, username, or personal identification number of the purchaser and an electronic address of the purchaser's computing system.

39. The non-transitory computer readable storage medium of claim 38, wherein the token comprises one or more of a stock keeping unit number of the product and/or service of the merchant, a unique name of the product and/or service, a merchant catalog number, and price information of the product and/or service.

40. The non-transitory computer readable storage medium of claim 35, wherein the receiving, authenticating, retrieving, and performing functions are performed without the purchaser providing purchaser financial account information to the merchant or merchant system.

41. The non-transitory computer readable storage medium of claim 35, further comprising:
one or more instructions that, when executed by the one or more central processing units of the private payment computer system, retrieve merchant information associated with the payee identifier; and
one or more instructions that, when executed by the one or more central processing units of the private payment computer system, send payment to a financial institution associated with the merchant and at least partly identified by the payee identifier in the token.

42. The non-transitory computer readable storage medium of claim 35, wherein the token is received by the gateway from the purchaser's computing system through the Internet and wherein, during transmission of the token from the purchaser's computing system to the private payment computer system, the token does not pass through the merchant system.

43. The non-transitory computer readable storage medium of claim 35, wherein the purchaser's computing system obtains the token by one or more of manual input via a user interface by the purchaser and via a web browser from an Internet page provided by a web server of the merchant system.

44. The non-transitory computer readable storage medium of claim 35, wherein the private payment computer system generates the entire token and provides the token to the merchant system during the purchase transaction between the purchaser and merchant and wherein the merchant system provides the token to the purchaser's computing system to forward to the private payment computer system.

* * * * *